United States Patent
Nakayama et al.

(10) Patent No.: US 8,976,203 B2
(45) Date of Patent: Mar. 10, 2015

(54) WAVELENGTH CONVERSION DEVICE AND IMAGE DISPLAY APPARATUS USING SAME

(75) Inventors: Kenji Nakayama, Kumamoto (JP); Tetsuro Mizushima, Fukuoka (JP); Tatsuo Itoh, Osaka (JP); Hiroyuki Furuya, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 573 days.

(21) Appl. No.: 13/266,956

(22) PCT Filed: Mar. 1, 2011

(86) PCT No.: PCT/JP2011/001184
§ 371 (c)(1),
(2), (4) Date: Oct. 28, 2011

(87) PCT Pub. No.: WO2011/108256
PCT Pub. Date: Sep. 9, 2011

(65) Prior Publication Data
US 2012/0044280 A1    Feb. 23, 2012

(30) Foreign Application Priority Data
Mar. 2, 2010   (JP) .................................. 2010-045134

(51) Int. Cl.
*G09G 5/10*   (2006.01)
*H01S 3/109*   (2006.01)
(Continued)

(52) U.S. Cl.
CPC ................ *H01S 3/109* (2013.01); *G03B 21/20* (2013.01); *H01S 3/0621* (2013.01); *H01S 3/0627* (2013.01);
(Continued)

(58) Field of Classification Search
None
See application file for complete search history.

(56) References Cited

U.S. PATENT DOCUMENTS

| | | | |
|---|---|---|---|
| 5,825,798 | A | 10/1998 | Momiuchi et al. |
| 6,222,862 | B1 | 4/2001 | Kinbara et al. |

(Continued)

FOREIGN PATENT DOCUMENTS

| | | |
|---|---|---|
| CN | 1142699 | 2/1997 |
| CN | 2351897 | 12/1999 |

(Continued)

OTHER PUBLICATIONS

International Search Report issued Apr. 5, 2011 in International (PCT) Application No. PCT/JP2011/001184.

*Primary Examiner* — Adam R Giesy
*Assistant Examiner* — Henok Heyi
(74) *Attorney, Agent, or Firm* — Wenderoth, Lind & Ponack, L.L.P.

(57) ABSTRACT

A wavelength conversion device includes an excitation light source that generates excitation light, a laser medium that generates fundamental light by means of the excitation light, two resonator mirrors that are disposed with the laser medium being interposed therebetween and resonate the fundamental light, a wavelength conversion element that is disposed between the two resonator mirrors and wavelength-converts the fundamental light to harmonic light, and a drive unit that generates a pulse modulation signal to pulse-drive the excitation light source. The laser medium is formed of a material having a thermo-optical effect and a positive thermo-optical constant. The pulse modulation signal generated by the drive unit has an initial interval including a rising edge of a pulse and a remaining interval subsequent to the initial interval. An average signal intensity during the initial interval is higher than an average signal intensity during the remaining interval.

15 Claims, 14 Drawing Sheets

(51) Int. Cl.
  *G03B 21/20* (2006.01)
  *H04N 9/31* (2006.01)
  *H01S 3/06* (2006.01)
  *H01S 3/08* (2006.01)
  *H01S 3/094* (2006.01)
  *H01S 3/131* (2006.01)

(52) U.S. Cl.
  CPC ....... *H01S 3/08072* (2013.01); *H01S 3/094076* (2013.01); *H01S 3/1312* (2013.01); *H04N 9/3111* (2013.01); *H04N 9/3161* (2013.01)
  USPC ........................................................ 345/690

(56) References Cited

U.S. PATENT DOCUMENTS

| | | | | |
|---|---|---|---|---|
| 2002/0051479 | A1* | 5/2002 | Fujikawa et al. | 372/70 |
| 2005/0163174 | A1* | 7/2005 | Nakayama et al. | 372/22 |
| 2008/0175286 | A1* | 7/2008 | Kamijima | 372/30 |
| 2008/0239171 | A1 | 10/2008 | Inoue et al. | |
| 2009/0174929 | A1* | 7/2009 | Egawa | 359/328 |
| 2009/0251766 | A1* | 10/2009 | Furuya et al. | 359/328 |
| 2010/0118142 | A1* | 5/2010 | Ohsawa | 348/140 |
| 2012/0183006 | A1* | 7/2012 | Yamamoto et al. | 372/43.01 |

FOREIGN PATENT DOCUMENTS

| | | |
|---|---|---|
| CN | 201134609 | 10/2008 |
| JP | 1-206678 | 8/1989 |
| JP | 2-146784 | 6/1990 |
| JP | 11-135860 | 5/1999 |
| JP | 2008-250037 | 10/2008 |
| JP | 2009-258142 | 11/2009 |

\* cited by examiner

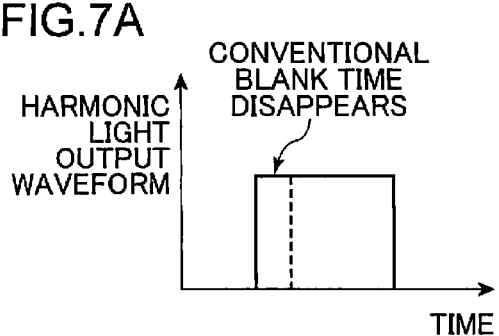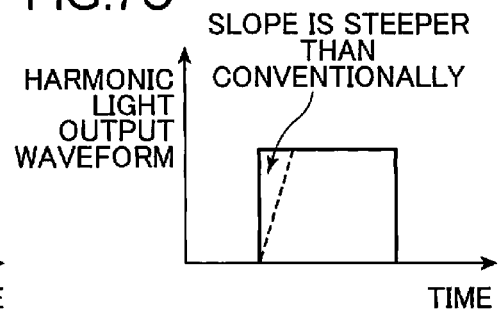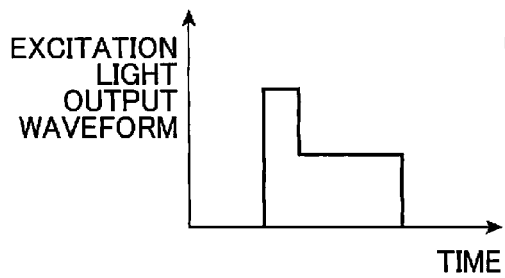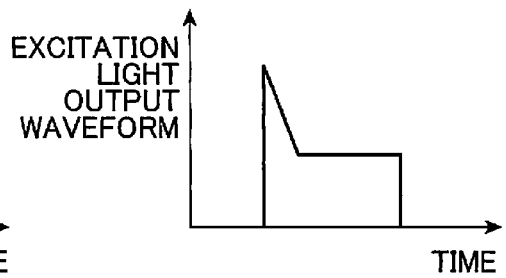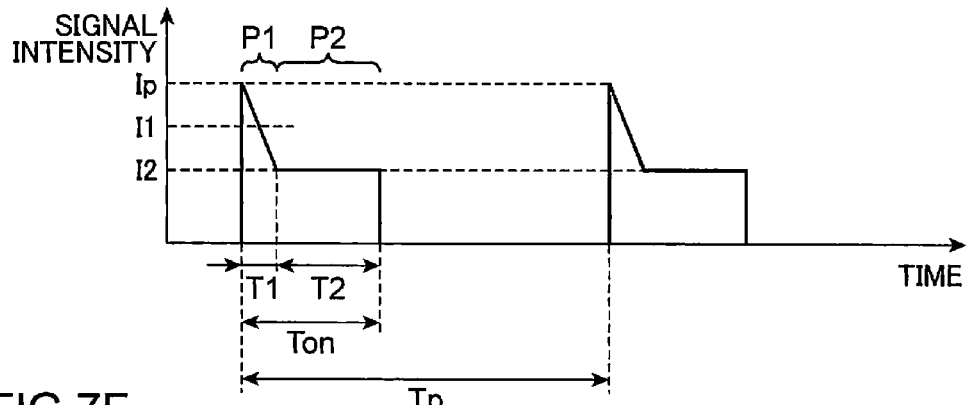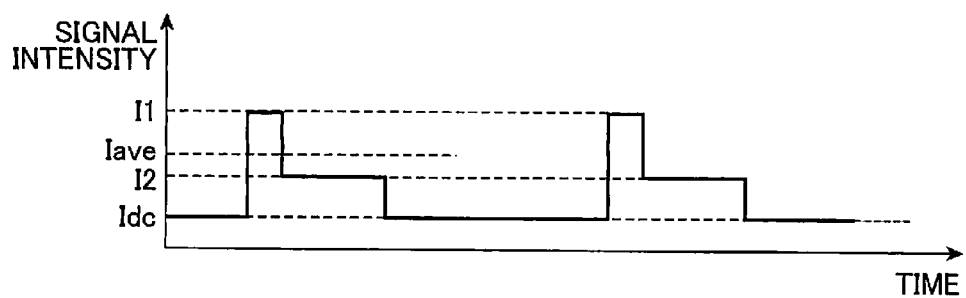

WAVELENGTH CONVERSION DEVICE AND IMAGE DISPLAY APPARATUS USING SAME

TECHNICAL FIELD

The present invention relates to a wavelength conversion device capable of efficiently converting fundamental light to harmonic light and an image display apparatus using the same.

BACKGROUND ART

In recent years, an image display apparatus using a laser as a light source, such as a projector or a liquid crystal television, is under research and development. A laser light source close to an ideal point light source is capable of efficiently condensing light into a small area. Accordingly, it is possible to scale down the optical system of a projector and implement the small-sized projector. In addition, if linearly polarized laser light is used for the back light of a liquid crystal television, the liquid crystal television having high light use efficiency and low power consumption can be implemented. The reason for this is as follows. Since a liquid crystal panel needs linearly polarized light to be incident thereon, when a lamp or an LED which emits randomly polarized light is used as a light source, a conventional liquid crystal television has had a polarized light filter which converts the randomly polarized light to linearly polarized light and, if linearly polarized laser light is used as a light source, it is possible to remove the polarized light filter from the liquid crystal television and suppress a light loss.

When a laser light source is used as the light source of such an image display apparatus, laser light sources for red, green, and blue colors that are the three primary colors of light are needed. However, while high-output red and blue laser light sources have been implemented by semiconductor lasers, a high-output green laser light source is hard to implement since it is difficult to form a practically optimum material that can be used to form a semiconductor laser for the high-output green laser light source. Therefore, attention has been given to, e.g., a wavelength conversion device which wavelength-converts fundamental light from a solid-state laser to a harmonic wave using a wavelength conversion element to output high-output green laser light and the development of the wavelength conversion device directed toward the large-scale production thereof has been promoted. The solid-state laser indicates a structure which uses a laser medium to obtain laser light, and examples thereof include a semiconductor laser excitation solid-state laser which achieves excitation using a semiconductor laser.

FIG. 15 is a plan view showing a schematic structure of a conventional wavelength conversion device 100. The conventional wavelength conversion device 100 shown in FIG. 15 includes an excitation laser light source 110, a condenser lens 110c, a laser medium 120, a concave mirror 200, two resonator mirrors 130 (130a and 130b), and a wavelength conversion element 140. Excitation light 110a emitted from the excitation laser light source 110 is condensed by the condenser lens 110c to be incident on the laser medium 120. The laser medium 120 absorbs the excitation light 110a and generates fundamental light 120a using the two resonator mirrors 130 (130a and 130b). The wavelength conversion element 140 is disposed between the two resonator mirrors 130 (130a and 130b) to wavelength-convert the fundamental light 120a to harmonic light 160. Note that each of the components is disposed on and fixed to a base stand 100a of the wavelength conversion device 100. As shown in FIG. 15, the resonator mirror 130a which is one of the two resonator mirrors 130 (130a and 130b) for resonating the fundamental light 120a uses an end surface 300 formed of the curved surface of the concave mirror 200. The conventional wavelength conversion device 100 has a large number of parts to result in the problem of high cost. Therefore, it has been proposed to form the resonator mirror 130a not on the end surface 300 of the concave mirror 200, but on an end surface of the wavelength conversion element 140 and remove the concave mirror 200.

However, in the case where the resonator mirror 130a is formed on the end surface of the wavelength conversion element 140, the problem arises that the efficiency of conversion (hereinafter referred to as electricity-to-light conversion efficiency) from power input to the excitation laser light source to the harmonic light 160 decreases compared with that in the conventional wavelength conversion device 100.

To implement a green laser light source having high electricity-to-light conversion efficiency and low power consumption, it is needed to efficiently convert the fundamental light to the harmonic light.

To satisfy the need, there is a method which heats the input terminal portion of a laser medium that outputs fundamental light to cause a change in the refractivity of the laser medium and converges the fundamental light propagating a wavelength conversion element by use of the refractivity change. It is shown that, thus, in the wavelength conversion element, an optical output per unit cross-sectional area in a plane perpendicular to the optical axis of the propagating fundamental light increases to increase a non-linear effect and a high efficiency of conversion to the harmonic light can be obtained (see, e.g., Patent Document 1).

In an image display apparatus, when the high-efficiency green laser light source thus obtained is used, it is important in maintaining high-quality display of a displayed image to operate the high-efficiency green laser light source while stabilizing an output of green laser light at a given value. Therefore, a high-brightness and high-definition image display apparatus according to a field sequential method is proposed in which a plurality of green laser light sources each using a wavelength conversion element are electrically controlled using a drive control device (see, e.g., Patent Document 2).

However, in the technology described above, the rising edge of the harmonic light thus obtained is not steep. As a result, if the harmonic light is to be used for the image display apparatus without any modification, the problem is encountered that it is difficult to obtain a high-brightness image display apparatus. In addition, since the rising edge is not steep, the problem is also encountered that gradation control is difficult and it is hard to obtain a high definition image.

Patent Document 1: Japanese Patent Application Laid-open No. H2-146784

Patent Document 2: Japanese Patent Application Laid-open No. 2008-250037

SUMMARY OF THE INVENTION

The present invention is for solving the foregoing conventional problems and an object of the present invention is to provide a high-efficiency wavelength conversion device which allows, even when used without any modification in an image display apparatus, a high-brightness and high-definition image to be displayed and is suitable for achieving a size reduction and a cost reduction.

A wavelength conversion device according to an aspect of the present invention includes: an excitation light source that generates excitation light; a laser medium that generates fundamental light by means of the excitation light; two resonator mirrors that are disposed with the laser medium being interposed therebetween and resonate the fundamental light; a wavelength conversion element that is disposed between the two resonator mirrors and wavelength-converts the fundamental light to harmonic light; and a drive unit that generates a pulse modulation signal to pulse-drive the excitation light source, wherein the laser medium is formed of a material having a thermo-optical effect and a positive thermo-optical constant, the pulse modulation signal generated by the drive unit has an initial interval including a rising edge of a pulse and a remaining interval subsequent to the initial interval, and an average signal intensity during the initial interval is higher than an average signal intensity during the remaining interval.

An image display apparatus according to another aspect of the present invention includes: a spatial light modulation element that spatially modulates incident light; and an illumination unit that includes a laser light source that emits light which illuminates the spatial light modulation element from one main surface side thereof, wherein the illumination unit includes a red laser light source that emits red laser light, a green laser light source that emits green laser light, and a blue laser light source that emits blue laser light, and the green laser light source is comprised of a solid-state laser light source that includes the wavelength conversion device described above.

An image display apparatus according to still another aspect of the present invention includes: a spatial light modulation element that spatially modulates incident light; an illumination unit that includes a red laser light source that emits red laser light, a green laser light source that emits green laser light and a blue laser light source that emits blue laser light, and illuminates the spatial light modulation element from one main surface side thereof; and a control unit that supplies a drive signal to the spatial light modulation element based on an image signal input thereto to drive the spatial light modulation element in accordance with a field sequential method, and causes the red, green, and blue laser light sources to successively emit light in synchronization with the drive signal supplied to the spatial light modulation element, wherein the green laser light source is comprised of a solid-state laser light source including a wavelength conversion device, wherein the wavelength conversion unit includes: an excitation light source that generates excitation light; a laser medium that is formed of a material having a thermo-optical effect and a positive thermo-optical constant and generates fundamental light by means of the excitation light; two resonator mirrors that are disposed with the laser medium being interposed therebetween and resonate the fundamental light; a wavelength conversion element that is disposed between the two resonator mirrors and wavelength-converts the fundamental light to harmonic light; and a drive unit that pulse-drives the excitation light source, and wherein the control unit causes a rising edge of the pulse-drive of the excitation light source to precede a rising edge of the drive signal supplied to the spatial light modulation element.

BRIEF DESCRIPTION OF THE DRAWINGS

FIGS. 2A and 2B are views each schematically showing the propagation of fundamental light in a laser medium interposed between the two resonator mirrors, of which FIG. 2A is the view showing the case of using a laser medium formed of a material having a thermo-optical effect and a positive thermo-optical constant and FIG. 2B is the view showing the case of using a laser medium formed of a material not having a thermo-optical effect as a comparative example.

FIGS. 6A and 6B are views showing light output waveforms obtained when an output of the excitation light and an output of harmonic light, when the excitation laser light source is driven by a drive unit using a rectangular current waveform, are viewed along the same time axes, of which FIG. 6A is the view showing the light output waveform of the harmonic light and FIG. 6B is the view showing the light output waveform of the excitation light.

FIGS. 7A to 7D are views showing excitation light output waveforms and harmonic light output waveforms when the excitation laser light source is driven using a current waveform in which the signal intensity of the rising portion of the pulse modulation signal is higher than the average signal intensity thereof, of which FIGS. 7A and 7C are the views showing the harmonic light output waveforms, of which FIGS. 7B and 7D are the views showing the excitation light output waveforms, FIG. 7E is a view showing the pulse modulation signal for outputting the excitation light shown in FIG. 7D, and FIG. 7F is a view showing another example of the pulse modulation signal.

FIGS. 10A and 10B are views showing the timings of laser light and image drive signals when the image display apparatus according to Embodiment 5 of the present invention is subjected to modulation according to a field sequential method, of which FIG. 10A is the view showing the timings of emission of the laser light and FIG. 10B is the view showing the timings of the drive signals for individual images in a spatial light modulation element.

FIGS. 11A to 11C are views showing light output waveforms in the image display apparatus according to Embodiment 5 of the present invention, of which FIG. 11A is the view showing a time waveform of a harmonic light output of a G light source, FIG. 11B is the view showing a time waveform of an excitation light output for the harmonic light output of FIG. 11A, and FIG. 11C is the view showing an example in which the magnitude of the harmonic light output of FIG. 11A is equally divided.

FIGS. 12A and 12B are views showing an excitation light output waveform and a harmonic light output waveform when the excitation laser light source is driven using a current waveform, shown in Embodiment 1 of the present invention, in which the signal intensity of the rising portion of the pulse modulation signal is higher than the average signal intensity thereof, of which FIG. 12A is the view showing the harmonic light output waveform and FIG. 12B is the view showing the excitation light output waveform.

FIGS. 13A to 13C are views showing a temporal relationship between the drive signal and the harmonic light output of the spatial light modulation element and the solid-state laser light source, of which FIG. 13A is the view showing a time waveform of the harmonic light output, FIG. 13B is the view showing a time waveform of an excitation light output, and FIG. 13C is the view showing a time waveform of the drive signal to the spatial light modulation element.

FIGS. 14A and 14B are views showing the timings of laser light and image drive signals when an image display apparatus, according to Embodiment 6 of the present invention, is subjected to modulation according to a field sequential method, of which FIG. 14A is the view showing the timings of emission of the laser light including excitation light and FIG. 14B is the view showing the timings of the drive signals for individual images in a spatial light modulation element.

BEST MODE FOR CARRYING OUT THE INVENTION

Figure 1A:
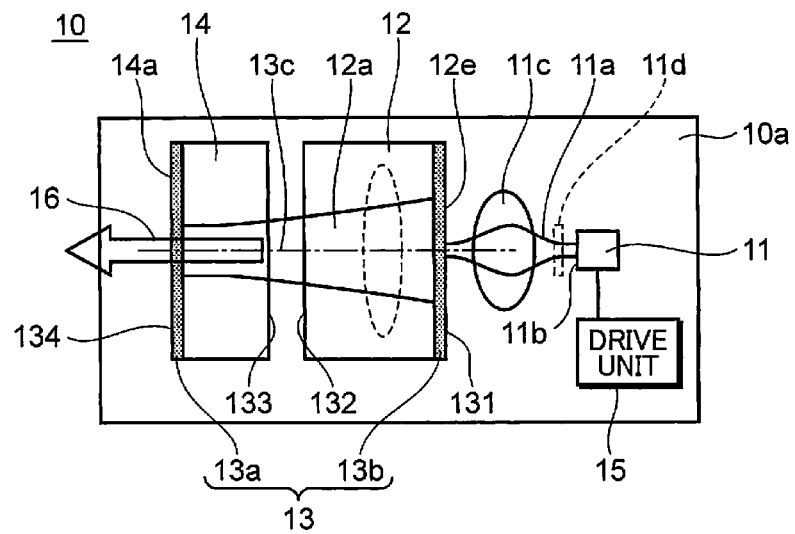
FIG. 1A is a plan view showing a schematic structure of a wavelength conversion device according to Embodiment 1 of the present invention.

Embodiments of the present invention will be described below with reference to the drawings. Note that the same components or components which perform like functions/operations are designated by the same reference numerals and a description thereof may be omitted. For clear illustration, the drawings are schematically shown based mainly on each of the components.

Embodiment 1

Figure 1B:
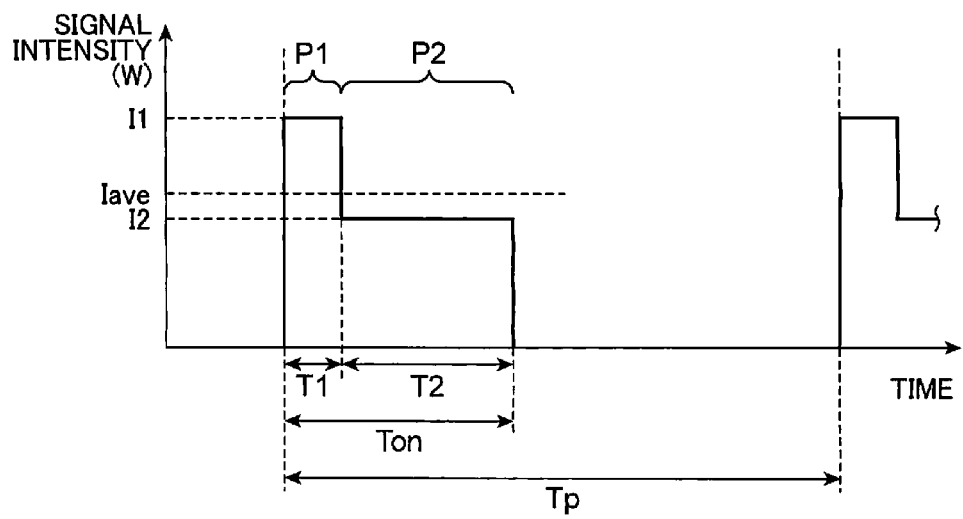
FIG. 1B is a view showing an example of a pulse modulation signal for driving the excitation laser light source of the wavelength conversion device according to Embodiment 1 of the present invention.
Figure 1C:
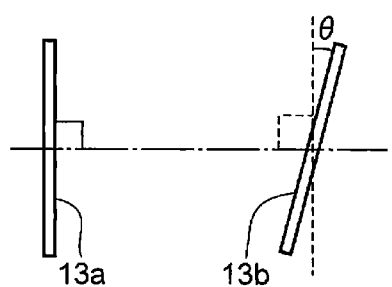
FIG. 1C is a view illustrating the degree of parallelism between the two resonator mirrors of the wavelength conversion device according to Embodiment 1 of the present invention.

FIG. 1A is a plan view showing a schematic structure of a wavelength conversion device 10 according to Embodiment 1 of the present invention, FIG. 1B is a view showing an example of a pulse modulation signal for driving an excitation laser light source 11 of the wavelength conversion device 10 according to Embodiment 1 of the present invention, and FIG. 1C is a view illustrating the degree of parallelism between the two resonator mirrors of the wavelength conversion device 10 according to Embodiment 1 of the present invention.

As shown in FIG. 1A, the wavelength conversion device 10 according to Embodiment 1 includes the excitation laser light source 11 as an excitation light source, a laser medium 12, two resonator mirrors 13 (13a and 13b), a wavelength conversion element 14, and a drive unit 15. Here, the excitation laser light source 11 generates excitation light 11a, and the laser medium 12 generates fundamental light 12a with the excitation light 11a. The excitation laser light source 11 is a semiconductor laser which generates laser light at, e.g., 808 nm, and the laser medium 12 is a YVO4 crystal which is doped with 1% Nd and absorbs laser light at 808 nm. Each of coatings on the surfaces of the two resonator mirrors 13 (13a and 13b) has a reflectance of not less than 99% with respect to, e.g., light at 1064 nm. The coating on the resonator mirror 13a has a transmittance of, e.g., not less than 95% with respect to light at 532 nm, and the coating on the resonator mirror 13b has a transmittance of, e.g., not less than 95% with respect to light at 808 nm. The two resonator mirrors 13 (13a and 13b) are arranged in the direction of incidence of the excitation light 11a with the laser medium 12 being interposed therebetween to resonate the fundamental light 12a. The wavelength conversion element 14 is disposed between the two resonator mirrors 13 (13a and 13b) to wavelength-convert the fundamental light 12a to harmonic light 16. The drive unit 15 drives the excitation laser light source 11 using, e.g., the pulse modulation signal of FIG. 1B. Note that the individual components are disposed on and fixed to a base stand 10a of the wavelength conversion device 10.

The laser medium 12 is formed of a material having a thermo-optical effect and a positive thermo-optical constant. The excitation light 11a generated in the excitation laser light source 11 is incident on the laser medium 12. In the laser medium 12, a temperature distribution is formed by the excitation light 11a in a direction perpendicular to an optical axis 13c of the excitation light 11a. In other words, the temperature of the laser medium 12 becomes higher in the vicinity of the optical axis 13c of the excitation light 11a than at a position apart from the optical axis 13c of the excitation light 11a to form the temperature distribution having a temperature difference in the direction perpendicular to the optical axis 13c. Since the laser medium 12 has the thermo-optical effect, it follows that, due to the foregoing temperature difference, a refractivity difference occurs in the direction perpendicular to the optical axis 13c of the excitation light 11a and the laser medium 12 has a lens effect (hereinafter referred to as "thermal lens effect"). In addition, since the thermo-optical constant of the laser medium 12 is positive, the thermal lens effect resulting from the thermo-optical effect has the same optical function as that of a convex lens. By the function of the convex lens resulting from the thermal lens effect, the fundamental light 12a is converged to be stably resonated by the two resonator mirrors 13a and 13b.

The wavelength conversion device 10 is configured such that, when the drive unit 15 drives the excitation laser light source 11 by pulse modulation, the driving is performed with a signal intensity such that a signal intensity I1 of the rising portion of the pulse modulation signal is higher than the average signal intensity Iave of the pulse modulation signal, as shown in FIG. 1B. Here, as the pulse modulation signal shown in FIG. 1B, a modified rectangular signal is used which has a pulse period Tp, an ON time Ton, and a duty ratio Rp=Ton/Tp. In other words, the drive unit 15 generates the pulse modulation signal shown in FIG. 1B to pulse-drive the excitation laser light source 11. The pulse modulation signal shown in FIG. 1B has an initial interval P1 including the rising edge of a pulse and a remaining interval P2 subsequent to the initial interval P1. During each of the initial interval P1 and the remaining interval P2, the pulse modulation signal has a rectangular wave shape, and the signal intensity I1 during the initial interval P1 is higher than a signal intensity I2 during the remaining interval P2.

Note that, since the pulse modulation signal has the rectangular wave shape during each of the initial interval P1 and the remaining interval P2, an average signal intensity during the initial interval P1 is equal to the signal intensity I1, and an average signal intensity during the remaining interval P2 is equal to the signal intensity I2. Accordingly, the average signal intensity during the initial interval P1 is higher than the average signal intensity during the remaining interval P2. The pulse modulation signal shown in FIG. 1B has the maximum signal intensity at the time of the rising edge thereof. Also, as shown in FIG. 1B, the pulse width (time) during the initial interval P1 is T1 and the pulse width (time) during the remaining interval P2 is T2. That is, Ton=T1+T2 is satisfied.

With the configuration, as will be described later, the wavelength conversion device 10 can solve a problem associated with a rise time during modulation (i.e., the problem that the rising edge of harmonic light is not steep during pulse-driving) and reduce a blank time when used in an image display apparatus. Therefore, it is possible to implement the high-efficiency wavelength conversion device 10 which allows a high-brightness and high-definition image to be displayed and is suitable for achieving a size reduction and a cost reduction.

Figure 2A:
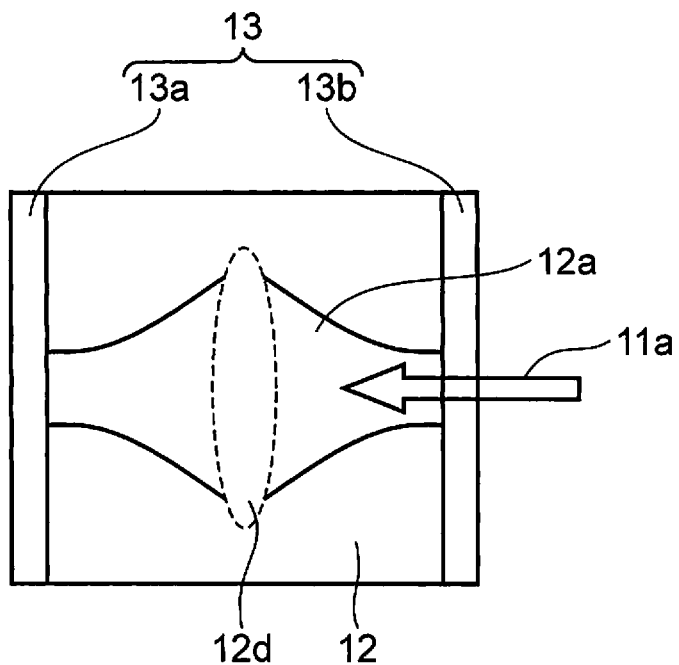
Figure 2B:
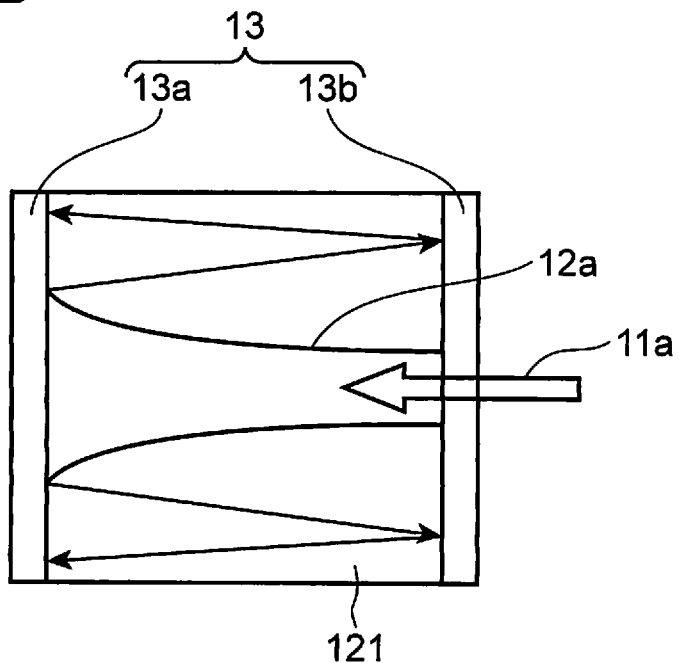

Next, a description will be given to a basic operation of the wavelength conversion device 10 of Embodiment 1. FIGS. 2A and 2B are views each schematically showing the propagation of the fundamental light 12a in the laser medium interposed between the two resonator mirrors 13 (13a and 13b), of which FIG. 2A is the view showing the case of using the laser medium 12 formed of a material having a thermo-optical effect and a positive thermo-optical constant and FIG. 2B is the view showing the case of using a laser medium 121 formed of a material not having a thermo-optical effect as a comparative example.

As shown in FIG. 2A, when the excitation light 11a is incident from the one-side resonator mirror 13b on the laser medium 12 so as to slightly diverge compared with parallel light, the fundamental light 12a propagates in the laser medium 12 while spreading out. However, the fundamental light 12a has a part thereof absorbed by the laser medium 12, while propagating through the laser medium 12, to cause the thermal lens effect. As a result, the entire laser medium 12 functions as if a convex lens 12d shown by the broken line in FIG. 2A is embedded therein so that the fundamental light 12a that has propagated as dispersed light begins to propagate as converged light at a middle point in the laser medium 12 and reaches the other-side resonator mirror 13a. Then, the fundamental light 12a having a part thereof reflected by the resonator mirror 13a reversely follows the same path and reaches the resonator mirror 13b. Thus, as shown in FIG. 2A, the laser medium 12 and the two resonator mirrors 13a and 13b between which the laser medium 12 is interposed form a stable laser resonator.

On the other hand, in the case of using the laser medium 121 formed of the material not having the thermo-optical effect, even when the excitation light 11a is incident from the one-side resonator mirror 13b on the laser medium 121, the fundamental light 12a propagates in the laser medium 121, while continuing to spread out. As a result, the fundamental light 12a propagates between the two resonator mirrors 13a and 13b as dispersed light so that the laser medium 121 and the two resonator mirrors 13a and 13b between which the laser medium 121 is interposed do not form a laser resonator, and the fundamental light 12a is dispersed.

Figure 3A:
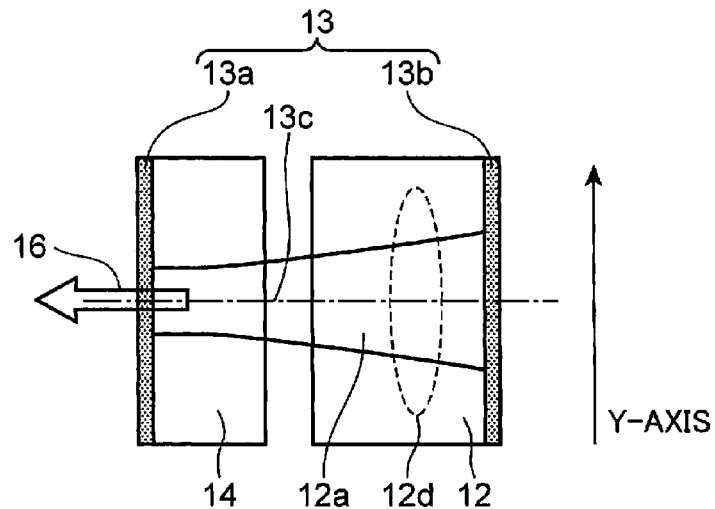
FIG. 3A is a view showing a structure of a laser resonator in which the laser medium having the thermo-optical effect and a wavelength conversion element are disposed between the two resonator mirrors.

FIG. 3A is a view showing a structure of the laser resonator in which the laser medium 12 having the thermo-optical effect and the wavelength conversion element 14 for converting the fundamental light 12a to the harmonic light 16 are disposed between the two resonator mirrors 13a and 13b. The fundamental light 12a is repeatedly reflected between the two flat resonator mirrors 13a and 13b without being dispersed by the convex lens 12d formed due to the thermal lens effect of the laser medium 12. The laser medium 12 and the two resonator mirrors 13a and 13b between which the laser medium 12 is interposed stably form the laser resonator.

Figure 3B:
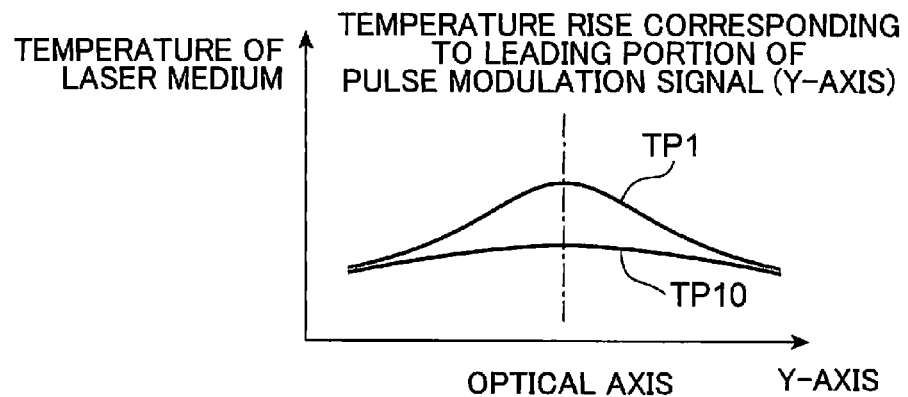
FIGS. 3B and 3C are views each schematically showing a temperature distribution in the laser medium along the Y-axis of FIG. 3A when an excitation laser light source is modulated by the pulse modulation signal shown in FIG. 1B.
Figure 3C:
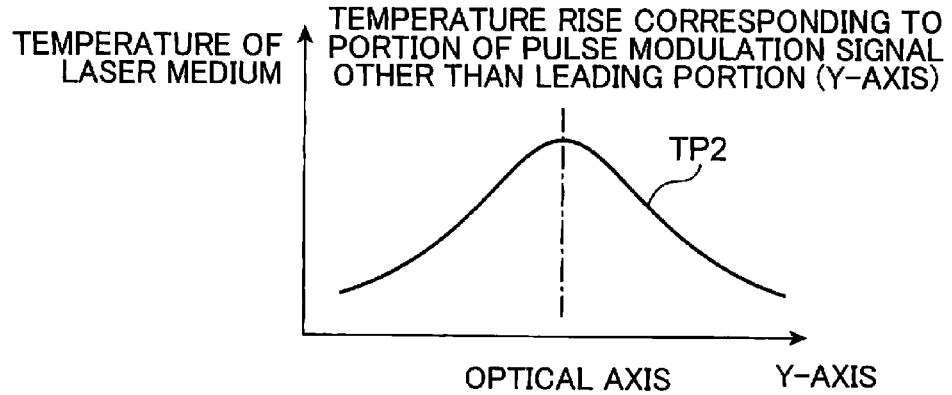

FIGS. 3B and 3C are views each schematically showing a temperature distribution in the laser medium 12 in a direction along the Y-axis of FIG. 3A when the excitation laser light source 11 is modulated by the pulse modulation signal shown in FIG. 1B. FIG. 3B shows the temperature distribution in the laser medium 12 when light corresponding to the leading portion of the pulse modulation signal has passed therethrough. In FIG. 3B, a temperature distribution TP1 is a temperature distribution in the laser medium 12 when light corresponding to the initial interval P1 of the pulse modulation signal shown in FIG. 1B has passed therethrough. A temperature distribution TP10 is the temperature distribution in the laser medium 12 when light corresponding to the leading portion of the pulse modulation signal having a normal rectangular waveform has passed therethrough, which is shown as a comparative example. In FIG. 3C, a temperature distribution TP2 is a temperature distribution in the laser medium 12 when light corresponding to the portion of the pulse modulation signal (i.e., the remaining interval P2 of the pulse modulation signal shown in FIG. 1B) other than the leading portion has passed therethrough.

The fundamental light 12a propagating in the laser resonator formed between the two resonator mirrors 13a and 13b propagates as a beam having a gaussian light quantity distribution in which a light quantity is maximized in the vicinity of the optical axis 13c. Consequently, as shown in FIGS. 3B and 3C, the temperature distribution is formed in which the temperature is maximized in the vicinity of the optical axis 13c. Here, for the laser medium 12 to achieve the effect of converging the fundamental light 12a due to the thermal lens effect optically similarly to a convex lens and form a stable laser resonator, when a refractivity is n and the temperature of the laser medium 12 is T, it is required to satisfy a thermo-optical constant (dn/dT)>0.

For example, a Nd:YVO4 crystal having a positive thermo-optical constant of $3.0 \times 10^{-6}$/K and used as the laser medium 12 of the wavelength conversion device 10 of Embodiment 1 optically achieves an effect provided by a convex lens due to the thermal lens effect. To obtain a greater effect, for example, a Nd:GdVO4 crystal having a positive thermo-optical constant of $4.7 \times 10^{-6}$/K or the like is preferably used as the laser medium 12. Since the Nd:GdVO4 crystal undergoes a larger refractivity change due to temperature, the effect of the convex lens becomes larger.

Note that the laser medium may also be a ceramic such as, e.g., YAG, instead of a single crystal.

The composition increases the concentration of Nd up to about 10% to allow an increase in the absorptivity of the ceramic with respect to incident excitation light so that a small-sized wavelength conversion device can be implemented. Also, by increasing the Nd concentration from 2% to 10% and increasing the absorptivity, the thermal lens effect becomes remarkable, and the wavelength conversion device has a shorter rise time during modulation.

Also by using a ceramic as the laser medium, increasing the concentration of an additive to 3% or more, increasing an impurity such as Fe remaining in the crystal, or the like, it is possible to increase an amount of heat generation and achieve a remarkable thermal lens effect. Accordingly, the wavelength conversion device 10 has a shorter rise time during modulation. In other words, it is possible to implement the wavelength conversion device 10 in which the rising edge of the harmonic light during pulse-driving is steep.

Depending on the specifications required of the light source of the harmonic light 16, pulse modulation and an increase in the absorptivity of the laser medium 12 may be each used alone or in combination.

Next, referring to FIGS. 1B and 1C, the signal intensity I1 during the initial interval P1 of the pulse modulation signal will be described. The intensity of the excitation light 11a required at the time of the rising edge of the pulse modulation signal varies depending on the degree of parallelism between the two resonator mirrors 13a and 13b. This is because, when the degree of parallelism between the two resonator mirrors 13a and 13b is high, the fundamental light 12a suitably resonates so that, even when the thermal lens effect resulting from the thermo-optical effect of the laser medium 12 is small, the intensity of the harmonic light 16 steeply rises but, when the degree of parallelism is low, the fundamental light 12a does not suitably resonate so that the intensity of the harmonic light 16 does not steeply rise. Here, as shown in FIG. 1C, the degree of parallelism is represented by a relative tilt θ between the resonator mirror 13a and the resonator mirror 13b. That is, when θ=0 is satisfied, the degree of parallelism is highest.

To cause the intensity of the harmonic light 16 to steeply rise even when the degree of parallelism between the resonator mirrors 13a and 13b is low, compared with the case where the degree of parallelism is high, the excitation light 11a of a higher intensity is required. According to the experiment conducted by the inventors, if the intensity of the harmonic light 16 obtained when the intensity of the excitation light 11a was held constant and θ=0 was satisfied is assumed to be 100%, the intensity of the harmonic light 16 obtained when θ=0.015 (degrees) was satisfied is 90%, the intensity of the harmonic light 16 obtained when θ=0.02 (degrees) was satisfied is 80%, and the intensity of the harmonic light 16 obtained when θ=0.035 (degrees) was satisfied is 50%.

Accordingly, in the present embodiment, when the degree of parallelism between the two resonator mirrors 13a and 13b is θ (arc-minute) and energy of the pulse modulation signal during the initial interval P1 is E (joule), the drive unit 15 generates a pulse modulation signal which satisfies:

$$3.33\theta + 1 < E < 3.78\theta + 3 \quad (1).$$

Here, the energy E during the initial interval P1 is represented using the average signal intensity I1 (watt) during the initial interval P1 and the pulse width T1 (second) during the initial interval P1 by:

$$E = I1 \times T1 \quad (2).$$

Therefore, in the present embodiment, it is possible to obtain the required intensity of the excitation light 11a in accordance with the degree of parallelism between the two resonator mirrors 13a and 13b, and therefore it is possible to cause the intensity of the harmonic light 16 to steeply rise.

In the foregoing expression (1), as the pulse width T1 during the initial interval P1 of the pulse modulation signal is shorter, the higher signal intensity I1 is required. Conversely, if it is possible to elongate the pulse width T1 during the initial interval P1, it is possible to suppress the signal intensity I1. Therefore, in the image display apparatus using the present embodiment as the light source, it is necessary to determine the signal intensity I1 in consideration of the maximum value of a current that can be supplied with a circuit and determine the pulse width T1 during the initial interval P1 based on the signal intensity I1 and the foregoing expression (1).

Next, the components of the wavelength conversion device 10 of Embodiment 1 will be described specifically. As shown in FIG. 1A, the laser medium 12 uses, e.g., a Nd:YVO4 crystal having a large thermo-optical constant. To excite the laser medium 12, as the excitation laser light source 11, an AlGaAs-based semiconductor laser locked to a wavelength of 808 nm, e.g., is used. Here, a wavelength selector 11d (shown by the broken line in FIG. 1A) such as a diffraction grating is disposed in opposing relation to a rear-side end surface 11b of the excitation laser light source 11 so that a part of laser light (not shown) from the rear-side end surface 11b of the excitation laser light source 11 is subjected to wavelength selection using the wavelength selector 11d such as a diffraction grating and returned to be incident on the rear-side end surface 11b. Thus, using the wavelength of the laser light subjected to wavelength selection and returned, wavelength locking to 808 nm is achieved. As a method for wavelength locking, a wavelength selection element may also be formed in the chip of the excitation laser light source 11. Alternatively, the excitation laser light source 11 may also be formed of a Distribution Feed Back laser. Otherwise, the excitation laser light source 11 may also be formed of a Distributed Bragg Reflector laser.

The configuration can reduce variations in the wavelength of the excitation light 11a due to temperature variations and allow a stable output of the harmonic light 16 to be obtained. In addition, as will be described later, the blank time does not increase under the influence of temperature but can be reduced and held, and therefore it is possible to implement the wavelength conversion device 10 having a more stable output.

The excitation light 11a emitted from such an excitation laser light source 11 is condensed by a condenser lens 11c to be incident on an end surface 12e of the laser medium 12. By the excitation light 11a, the laser medium 12 is excited to generate the fundamental light 12a at a wavelength of 1064 nm. The fundamental light 12a propagates in the laser medium 12, while being amplified, to be incident in a slightly converged state on the wavelength conversion element 14 due to the thermal lens effect of the laser medium 12, as shown in FIG. 1A. The wavelength conversion element 14 converts a part of the fundamental light 12a to the green harmonic light 16 at 532 nm as a second harmonic wave using a non-linear optical effect, and outputs the green harmonic light 16 as output light from a one-side end surface 14a. Here, the laser medium 12 uses the Nd:YVO4 crystal having a thickness of 2 mm and doped with 1% Nd. On the other hand, the wavelength conversion element 14 uses PPMgLN having a thickness of 0.5 mm.

As shown in FIG. 1A, of the two resonator mirrors 13 and 13b, the one-side resonator mirror 13b may also be formed of the end surface 12e of the laser medium 12 and the other-side resonator mirror 13a may also be formed of the end surface 14a of the wavelength conversion element 14.

The configuration eliminates the need to newly dispose a resonator mirror, and therefore the compact wavelength conversion device 10 can be implemented.

The respective both end surfaces of the laser medium 12 and the wavelength conversion elements 14 are coated with, e.g., dielectric multilayer films 131, 132, 133, and 134. Here, the dielectric multilayer film 131 is formed to exhibit a high reflectance to each of wavelengths of 1064 nm and 532 nm and no reflection to a wavelength of 808 nm. The dielectric multilayer films 132 and 133 are formed to exhibit no reflection to a wavelength of 1064 nm. The dielectric multilayer film 134 is formed to exhibit a high reflectance to a wavelength of 1064 nm and no reflection to a wavelength of 532 nm.

According to the configuration, the excitation light 11a is efficiently incident on the laser resonator including the two resonator mirrors 13a and 13b with a low loss and the harmonic light 16 as output light is efficiently output with a low loss. The fundamental light 12a stably oscillates in the laser resonator including the two resonator mirrors 13a and 13b.

In such a configuration, when the wavelength conversion device 10 was excited with the excitation light 11a at a wavelength of 808 nm having an output peak value of 3 W, green laser light at a wavelength of 532 nm having an output peak value of 0.9 W could be obtained with high efficiency. A modulation frequency 1/Tp when the excitation laser light source 11 at this time was modulated using the drive unit 15 was 120 Hz and the duty ratio Rp was 33.3%.

Figure 4A:
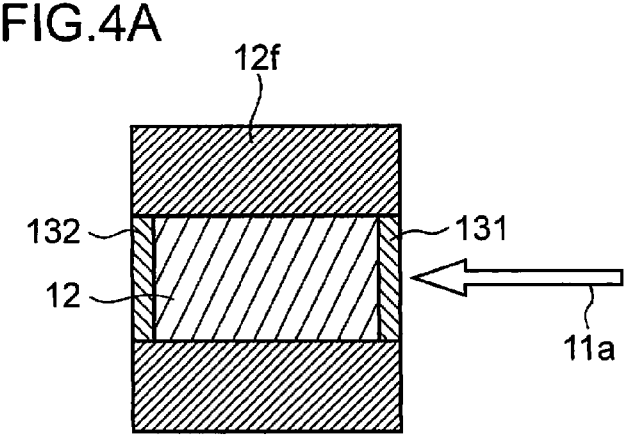
FIG. 4A is a side cross-sectional view of the laser medium and a holder.
Figure 4B:
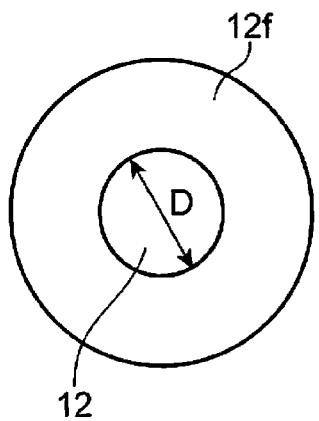
FIG. 4B is a front view of the laser medium and the holder.
Figure 4C:
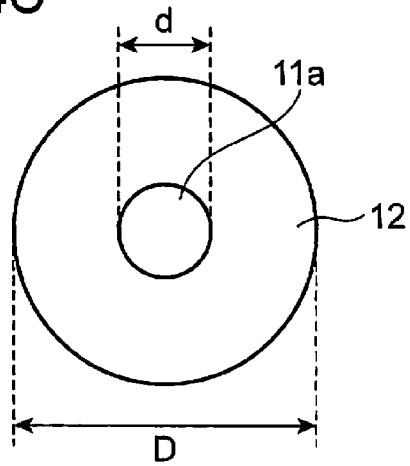
FIG. 4C is a view showing the diameters of the laser medium and the excitation light.
Figure 4D:
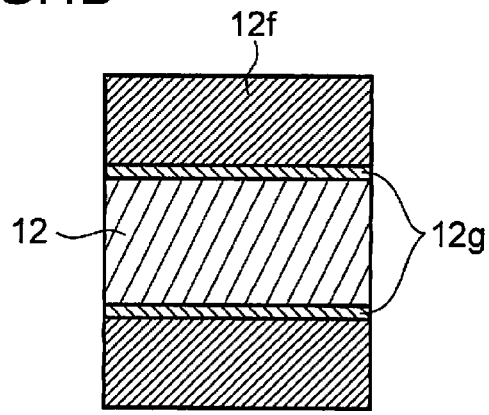
FIG. 4D is a side cross-sectional view showing an example in which a resin is inserted in the gap between the laser medium and the holder.

FIG. 4A is a side cross-sectional view of the laser medium and a holder, FIG. 4B is a front view of the laser medium and the holder, FIG. 4C is a view showing the diameters of the laser medium and the excitation light, and FIG. 4D is a side cross-sectional view showing an example in which a resin is inserted in the gap between the laser medium and the holder. Referring to FIGS. 1A and 4A to 4D, the structures of the laser medium and the like will be described.

A distribution of refractivity variations caused by a thermo-optical effect resulting from the incidence of the excitation light 11a on the laser medium 12 is preferably axially symmetrical with respect to the optical axis of the excitation light 11a. This is because, if the distribution of the refractivity variations is axially symmetrical, it is possible to more reliably prevent the thermal lens effect resulting from the thermo-optical effect from being distorted relative to the optical axis of the excitation light 11a than in the case where the distribution of the refractivity variations is not axially symmetrical and more reliably prevent the beams of the fundamental light 12a resonated by the two resonator mirrors 13a and 13b from being distorted. By suppressing the distortion of the beam of the fundamental light 12a, the harmonic light 16 can be obtained with high efficiency.

Accordingly, in the present embodiment, as shown in FIGS. 4A and 4B, the laser medium 12 is formed in a cylindrical shape having an axis parallel with the direction of incidence of the excitation light 11a and, in addition, a holder 12f that holds the laser medium 12 is formed to have a cylindrical hollow portion. The holder 12f can dissipate heat generated in the laser medium 12 axially symmetrically with respect to the optical axis of the excitation light 11a by holding the laser medium 12 contained in the cylindrical hollow portion. Therefore, it is possible to form a temperature distribution having a temperature difference in an axially symmetrical configuration and allow the distribution of the refractivity variations resulting from the thermo-optical effect to have axial symmetry.

Additionally, in the present embodiment, as shown in FIG. 4C, when the diameter of the laser medium 12 is D and the diameter of the beam of the excitation light 11a is d, 2d≤D≤5d is satisfied. If the diameter D of the laser medium 12 is smaller than the beam diameter d of the excitation light 11a, vignetting of the excitation light 11a occurs at the surface of incidence of the laser medium 12 to reduce efficiency. On the other hand, if the diameter D of the laser medium 12 is not less than double the beam diameter d of the excitation light 11a, the vignetting of the excitation light 11a at the surface of incidence of the laser medium 12 can be eliminated. Furthermore, if the diameter D of the laser medium 12 is not more than five times the beam diameter d of the excitation light 11a, the thermal resistance between the portion of the laser medium 12 which generates heat through the absorption of the excitation light 11a and the holder 12f can be reduced. Therefore, the temperature rise of the entire laser medium 12 can be suppressed. As a result, it is possible to suppress a reduction in the efficiency of conversion from the excitation light 11a to the fundamental light 12a due to the temperature rise of the entire laser medium 12.

That is, to stably achieve laser oscillation of the fundamental light 12a using the thermo-optical effect occurring in the laser medium 12, it is required to produce a temperature difference in the region of the laser medium 12 through which the fundamental light 12a passes and cause the thermal lens effect with respect to the fundamental light 12a. To satisfy the requirement, in the region through which the fundamental light 12a passes, the difference between the temperature at the center of the beam of the fundamental light 12a and the temperature outside the beam is preferably larger. On the other hand, when the temperature of the laser medium 12 increases, the efficiency of conversion from the excitation light 11a to the fundamental light 12a decreases so that the temperature of the entire laser medium 12 is preferably lower. Therefore, the performance of heat dissipation from the laser medium 12 to the holder 12f is preferably higher.

Accordingly, in the present embodiment, the holder 12f is formed of metal. For example, there can be used copper, iron, aluminum, zinc, or the like. Since metal has high thermal conductivity, it is possible to efficiently reduce the temperature of the entire laser medium 12, and reduce the temperature rise of the entire laser medium 12.

Note that, as shown in FIG. 4D, in the gap between the laser medium 12 and the holder 12f, a resin 12g such as a thermally conductive grease is preferably inserted so as to enhance the adhesion between the laser medium 12 and the holder 12f. By doing so, it is possible to increase thermal conductivity between the laser medium 12 and the holder 12f and suppress the temperature rise of the entire laser medium 12. Note that, instead of the thermally conductive grease, a metal capable of enhancing the adhesion such as an indium plating may also be used.

Moreover, to cause a temperature difference in the region of the laser medium 12 through which the fundamental light 12a passes, the thermal conductivity of the laser medium 12 is preferably lower. For example, compared with Nd:YAG having a thermal conductivity of 14 W/m·K, Nd:YVO4 having a thermal conductivity of 5.32 W/m·K lower than that of Nd:YAG is more preferably used as the laser medium 12.

To increase the conversion efficiency, it may also be possible to adopt a configuration in which the laser medium 12 and the wavelength conversion element 14 are arranged adjacent to each other or are joined together, along the optical axis 13c.

Embodiment 2

Figure 5:
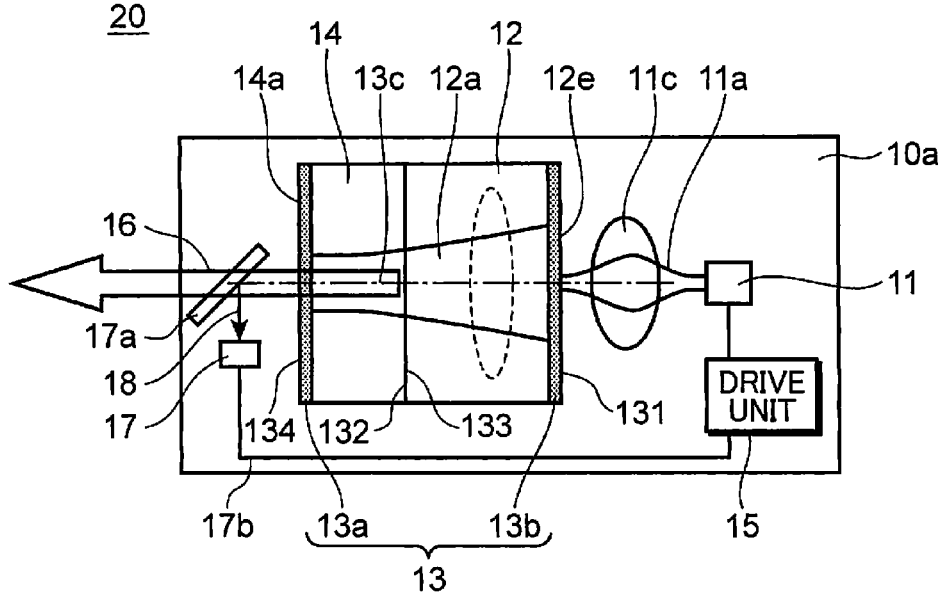
FIG. 5 is a plan view showing a schematic structure of a wavelength conversion device according to Embodiment 2 of the present invention.

FIG. 5 is a plan view showing a schematic structure of a wavelength conversion device 20 according to Embodiment 2 of the present invention. The wavelength conversion device 20 shown in FIG. 5 includes the excitation laser light source 11, the laser medium 12, the two resonator mirrors 13 (13a and 13b), the wavelength conversion element 14, and the drive unit 15, similarly to the wavelength conversion device 10 shown in FIG. 1A.

The laser medium 12 is formed of a material having a thermo-optical effect and a positive thermo-optical constant, and the excitation light 11a is incident on the laser medium 12. This causes the resonance of the fundamental light 12a by the two resonator mirrors 13a and 13b, produces a temperature distribution having a temperature difference in a direction perpendicular to the optical axis 13c thereof, and stabilizes the resonance of the fundamental light 12a using the temperature distribution. The wavelength conversion device 20 is configured such that, when the drive unit 15 drives the excitation laser light source 11 by pulse modulation, the driving is performed with a signal intensity such that the signal intensity I1 of the rising portion of the pulse modulation signal is higher than the average signal intensity Iave of the pulse modulation signal, as shown in FIG. 1B. Here, as the pulse modulation signal shown in FIG. 1B, a modified rectangular signal is used which has the pulse period Tp, the ON time Ton, and the duty ratio Rp=Ton/Tp. In other words, the pulse modulation signal shown in FIG. 1B has the initial interval P1 and the remaining interval P2. The pulse modulation signal shown in FIG. 1B has the rectangular wave shape during each of the initial interval P1 and the remaining interval P2 so that the average signal intensity during the initial interval P1 is equal to the signal intensity I1 and the average signal intensity during the remaining interval P2 is equal to the signal intensity I2. Accordingly, the average signal intensity during the initial interval P1 is higher than the average signal intensity during the remaining interval P2.

Note that, unlike the wavelength conversion device 10 shown in FIG. 1A, the wavelength conversion device 20 shown in FIG. 5 has a configuration in which the laser medium 12 and the wavelength conversion element 14 are joined together along the optical axis 13c. That is, the end surface of the laser medium 12 having the dielectric multilayer film 132 laminated thereon and the end surface of the wavelength conversion element 14 having the dielectric multilayer film 133 laminated thereon are joined together using, e.g., a light transmissive adhesive. Note that the wavelength conversion device 20 may also have a configuration in which the laser medium 12 and the wavelength conversion element 14 are not joined together, but are merely disposed adjacent to each other along the optical axis 13c.

The configuration allows a reduction in the length over which the laser medium 12 and the wavelength conversion element 14 are arranged in a direction along the optical axis 13c, and allows the more compact wavelength conversion device 20 to be implemented. Moreover, since there is no need to adjust the two resonator mirrors 13a and 13b, the low-cost wavelength conversion device 20 can be implemented.

Also, unlike the wavelength conversion device 10 shown in FIG. 1A, the wavelength conversion device 20 shown in FIG. 5 further includes a light detector 17 that receives fundamental light 18. The fundamental light 18 slightly leaking out of the resonator mirror 13a is reflected by a dichroic mirror 17a and detected by the light detector 17. This allows a change in the output of the fundamental light 12a to be monitored so that a detection signal from the light detector 17 is electrically feedbacked to the drive unit 15 via a wiring line 17b. The drive unit 15 is configured to change the intensity of modulation of the excitation laser light source 11 in accordance with the output waveform of the fundamental light 18.

The configuration allows the drive unit 15 to feedback the output of the fundamental light 18 thereto and drive the excitation laser light source 11 in such a manner as to eliminate a characteristic difference resulting from the individual variability of the laser medium 12 or the resonator mirror 13. Furthermore, since the invisible fundamental light 18 which is, e.g., infrared laser light at a wavelength of 1064 nm is kept from going out of the wavelength conversion device 20, the safer wavelength conversion device 20 can be implemented.

Figure 6A:
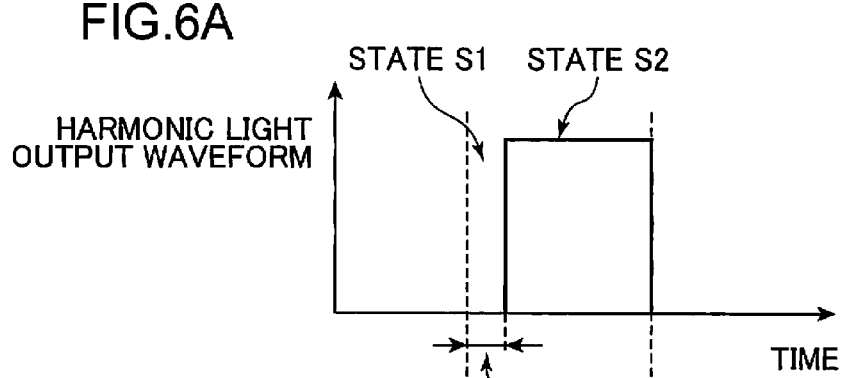
Figure 6B:
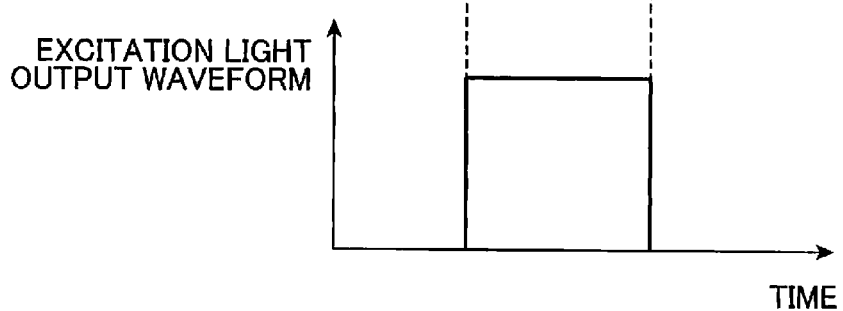

FIGS. 6A and 6B are views showing light output waveforms obtained when an output of the excitation light 11a and an output of the harmonic light 16, when the excitation laser light source 11 is driven by the drive unit 15 using a rectangular current waveform, are viewed along the same time axes, of which FIG. 6A is the view showing the light output waveform of the harmonic light 16 and FIG. 6B is the view showing the light output waveform of the excitation light 11a.

When the laser medium 12 shown in FIG. 5 is excited by the excitation light 11a having a pulse-like rectangular waveform shown in FIG. 6B, unlike in the case where modulation is performed using the CW (continuous-wave) excitation light 11a, a temperature distribution in a plane perpendicular to the optical axis 13c temporally varies and is not constant. Accordingly, it takes a little time for the temperature to rise until the thermal lens effect occurs in the laser medium 12, and it also takes a little time for the fundamental light 12a to oscillate. Therefore, the harmonic light 16 as the output light from the wavelength conversion device 20 is not generated until the fundamental light 12a oscillates so that a blank time TB shown in a state S1 occurs. However, after that, the temperature in the laser medium 12 rises to cause the thermal lens effect so that the harmonic light 16 is generated as shown in a state S2. To prevent the occurrence of such a blank time TB, the excitation laser light source 11 may be driven appropriately with a signal intensity such that the signal intensity I1 of the rising portion of the pulse modulation signal is higher than the average signal intensity Iave of the pulse modulation signal, as shown in FIG. 1B. That is, the excitation laser light source 11 is modulated using a current corresponding to a pulse modulation signal as shown in FIG. 1B. Then, since the signal intensity I1 of the rising portion is higher than the average signal intensity Iave, the inner temperature of the laser medium 12 rapidly increases. As a result, it is possible to reduce the blank time TB until the harmonic light 16 is output.

By having a configuration in which the excitation laser light source 11 of the wavelength conversion device 20 shown in FIG. 5 is current-driven using the pulse modulation signal shown in FIG. 1B, the wavelength conversion device 20 can solve the problem that the rising edge of the harmonic light is not steep during pulse modulation and reduce the blank time TB when used in an image display apparatus. Therefore, it is possible to implement the high-efficiency wavelength conversion device 20 which allows a high-brightness and high-definition image to be displayed and is suitable for achieving a size reduction and a cost reduction.

Embodiment 3

FIGS. 7A to 7D are views showing excitation light output waveforms and harmonic light output waveforms when the excitation laser light source 11 is driven using a current waveform in which the signal intensity I1 of the rising portion of the pulse modulation signal is higher than the average signal intensity Iave thereof in the wavelength conversion device 20 (FIG. 5) according to Embodiment 3 of the present invention, of which FIGS. 7A and 7C are the views showing the harmonic light output waveforms, FIGS. 7B and 7D are the views showing the excitation light output waveforms. FIG. 7E is a view showing the pulse modulation signal for outputting the excitation light shown in FIG. 7D. FIG. 7F is a view showing another example of the pulse modulation signal.

When a rectangular waveform is used as the excitation light output waveform, in the case where there is a blank time in the harmonic light output waveform as indicated by the broken line shown in FIG. 7A, if the laser medium 12 is excited with excitation light 11a as shown in FIG. 7B, the conventional blank time disappears, as indicated by the solid line in FIG. 7A. Also, when a rectangular waveform is used as the excitation light output waveform, in the case where the rising edge of the harmonic light output waveform is not steep as indicated by the broken line shown in FIG. 7C, if the laser medium 12 is excited with excitation light 11a as shown in FIG. 7D, the rising edge of the harmonic light output waveform becomes steep, as indicated by the solid line shown in FIG. 7C.

When the drive unit 15 (FIG. 5) generates the pulse modulation signal shown in FIG. 1B and drives the excitation laser light source 11 (FIG. 5), the excitation light 11a shown in FIG. 7B is output. When the drive unit 15 generates the pulse modulation signal shown in FIG. 7E and drives the excitation laser light source 11, the excitation light 11a shown in FIG. 7D is output. The pulse modulation signal shown in FIG. 7E has the initial interval P1 and the remaining interval P2 similarly to the pulse modulation signal shown in FIG. 1B. However, unlike the pulse modulation signal shown in FIG. 1B, the pulse modulation signal shown in FIG. 7E has the waveform of a triangular wave during the initial interval P1. That is, the signal intensity Ip at the time of the rising edge is maximum, which then linearly decreases to the signal intensity I2. Also, in the pulse modulation signal shown in FIG. 7E, the average signal intensity I1 during the initial interval P1 satisfies $$I1=(Ip+I2)/2.$$

Therefore, the average signal intensity I1 during the initial interval P1 is higher than the average signal intensity I2 during the remaining interval P2 in the same manner as in the pulse modulation signal shown in FIG. 1B. To the pulse modulation signal shown in FIG. 7E also, the foregoing expressions (1) and (2) are applicable.

It may also be possible to drive the excitation laser light source 11 so as to superimpose CW (continuous-wave) light on the excitation light 11a shown in FIGS. 7B and 7D. That is, when the drive unit 15 drives the excitation laser light source 11 by pulse modulation, as shown in FIG. 7F, the drive unit 15 may also produce a signal in which a DC (direct-current) signal is superimposed on the pulse modulation signal and drive the excitation laser light source 11. At this time, the signal intensity Idc of the DC signal may be set appropriately to a value not exceeding a threshold at which the fundamental light 12a oscillates.

According to the configuration, a temperature distribution is formed in a plane perpendicular to the optical axis 13c in the laser medium 12 using the superimposed DC signal to allow a further reduction in blank time. Therefore, it is possible to implement the high-efficiency wavelength conversion device 20 which allows a high-brightness and high-definition image to be displayed and is suitable for achieving a size reduction and a cost reduction. Note that the drive unit 15 may also generate a signal in which a DC signal is superimposed on the pulse modulation signal shown in FIG. 7E.

Embodiment 4

Figure 8A:
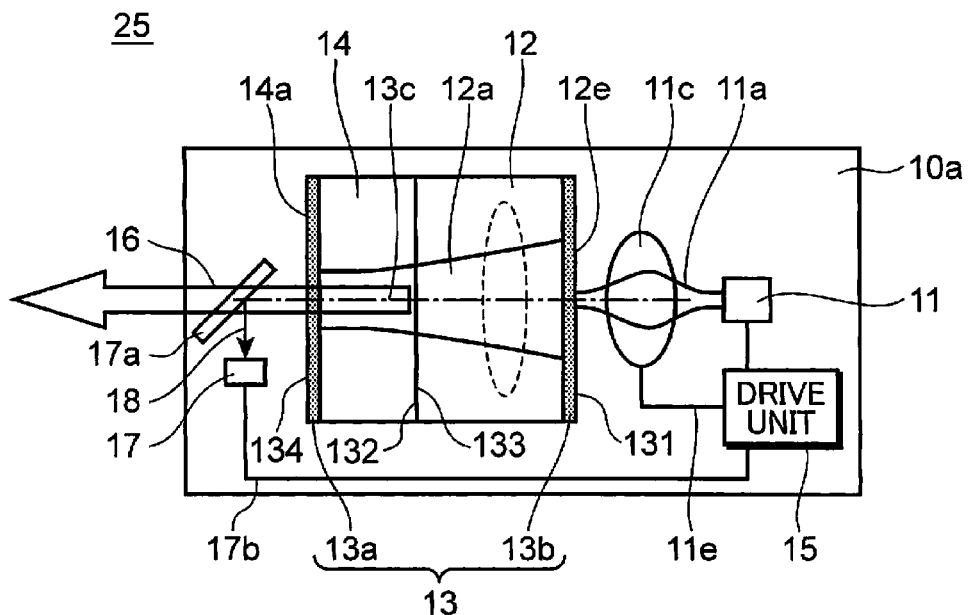
FIG. 8A is a view showing a wavelength conversion device according to Embodiment 4 of the present invention.
Figure 8B:
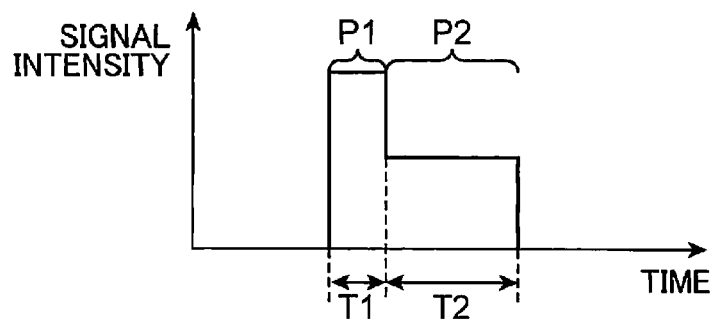
FIG. 8B is a view showing a pulse modulation signal generated by a drive unit.
Figure 8C:
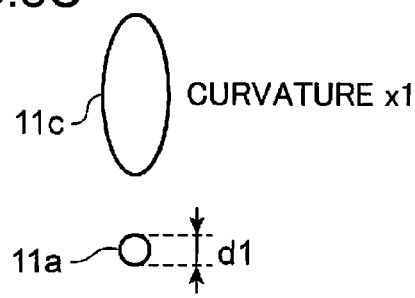
FIGS. 8C and 8D are views showing the curvature of a condenser lens and the beam diameter of excitation light.
Figure 8D:
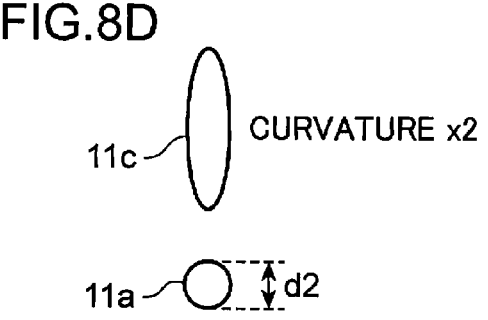

FIG. 8A is a view showing a wavelength conversion device 25 according to Embodiment 4 of the present invention, FIG. 8B is a view showing a pulse modulation signal generated by the drive unit 15, and FIGS. 8C and 8D are views showing the curvature of a condenser lens 11c and the beam diameter of the excitation light 11a. The wavelength conversion device 25 according to Embodiment 4 of the present invention is configured to use a liquid lens as the condenser lens 11c, and the drive unit 15 and the condenser lens 11c are connected via a wiring line 11e. The configuration is otherwise the same as that of the wavelength conversion device 20 shown in FIG. 5. The liquid lens is a lens having a concave-convex shape which changes in accordance with a voltage applied to a liquid portion. By changing the concave-convex configuration of the liquid lens having the function of the condenser lens 11c, the beam diameter of the excitation light 11a incident on the laser medium 12 can be changed at a high speed. Therefore, when, e.g., the drive unit 15 drives the excitation laser light source 11 by pulse modulation using the pulse modulation signal shown in FIG. 8B, the curvature of the liquid lens is increased such that the beam diameter of the excitation light 11a incident on the laser medium 12 is smaller than the average beam diameter of the excitation light 11a when the portion thereof corresponding to the rising portion of the pulse modulation signal is incident and the curvature of the liquid lens is reduced such that the beam diameter of the excitation light 11a incident on the laser medium 12 is larger than the average beam diameter of the excitation light 11a when the portion thereof corresponding to the falling portion of the pulse modulation signal is incident.

That is, as shown in FIG. 8C, the drive unit 15 sets the curvature of the liquid lens 11c to a first curvature value x1 during the initial interval P1. Consequently, the excitation light 11a is formed into a beam having a diameter d1. On the other hand, as shown in FIG. 8D, the drive unit 15 sets the curvature of the liquid lens 11c to a second curvature value x2 smaller than the first curvature value x1 during the remaining interval P2. Consequently, the excitation light 11a is formed into a beam having a diameter d2. Since x1>x2 is satisfied, d1<d2 is satisfied. That is, the excitation light 11a is formed into the beam which is more converged during the initial interval P1 than during the remaining interval P2. Therefore, during the initial interval P1, the temperature rise of the laser medium 12 at a position where the excitation light 11a is incident can be made steeper.

The configuration allows a desired temperature distribution to be promptly formed in the rising portion of the pulse modulation signal and thereby allows a further reduction in blank time. As a result, it is possible to implement the high-efficiency wavelength conversion device 25 which allows a high-brightness and high-definition image to be displayed and is suitable for achieving a size reduction and a cost reduction.

Embodiment 5

Figure 9:
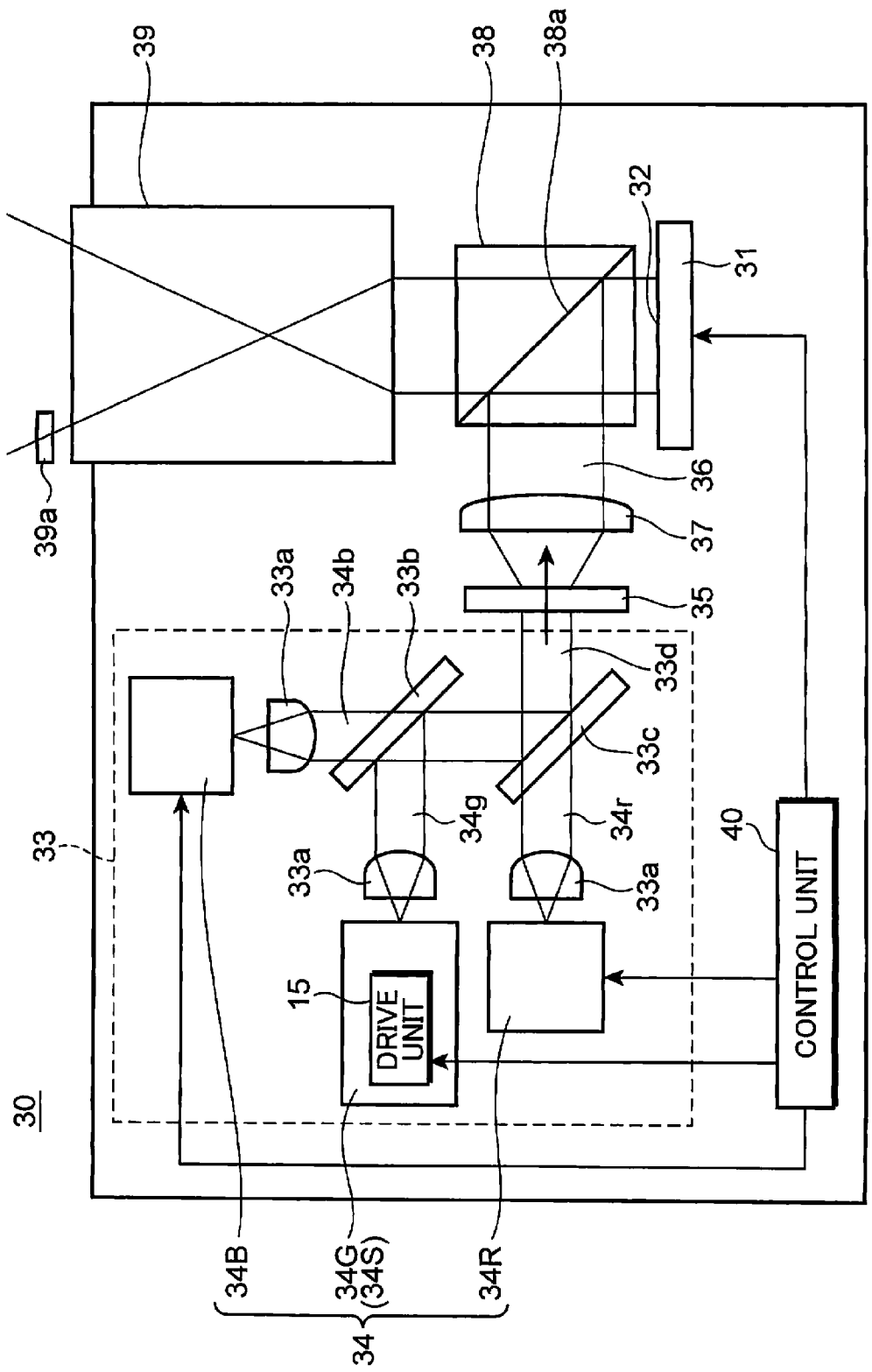
FIG. 9 is a plan view showing a schematic structure of an image display apparatus according to Embodiment 5 of the present invention.

FIG. 9 is a plan view showing a schematic structure of an image display apparatus 30 according to Embodiment 5 of the present invention. As shown in FIG. 9, the image display apparatus 30 of Embodiment 5 includes a spatial light modulation element 31, and an illumination device 33 which illuminates the spatial light modulation element 31 from a one-side main surface 32. The light source of the illumination device 33 includes a plurality of laser light sources 34, and the laser light sources 34 include structures using at least laser light sources 34R, 34G, and 34B which emit red laser light, green laser right, and blue laser light, respectively. Of the laser light sources 34, at least the laser light source which emits the green laser light uses a solid-state laser light source 34S including any of the wavelength conversion devices 10, 20, and 25 described in Embodiments 1 to 4.

The configuration allows the image display apparatus 30 capable of displaying a high-brightness and high-definition image, as will be described later, to be implemented.

Next, a description will be given to an optical operation of the image display apparatus 30 of Embodiment 5. As shown in FIG. 9, the illumination device 33 of the image display apparatus 30 includes the plurality of laser light sources 34. The illumination device 33 includes at least the red laser light source (hereinafter referred to as "R light source") 34R which emits red laser light (hereinafter referred to as "R light") 34r, the green laser light source (hereinafter referred to as "G light source") 34G which emits green laser light (hereinafter referred to as "G light") 34g, and the blue laser light source (hereinafter referred to as "B light source") 34B which emits blue laser light (hereinafter referred to as "B light") 34b. Here, the G light source 34G is the solid-state laser light source 34S including any of the wavelength conversion devices 10, 20, and 25 described in Embodiments 1 to 4, and includes the drive unit 15, as shown in FIG. 9. A control unit 40 supplies a drive signal to the spatial light modulation element 31 based on, e.g., an image signal input from the outside to drive the spatial light modulation element 31 in accordance with a field sequential method (described later). Also, the control unit 40 causes the R light source 34R, the solid-state laser light source 34S (G light source 34G), and the B light source 34B to successively emit light in synchronization with the drive signal supplied to the spatial light modulation element 31.

The R light 34r, the G light 34g, and the B light 34b respectively emitted from the plurality of laser light sources 34R, 34G, and 34B are each converted to parallel light by a collimator 33a and converged into one light flux 33d by two dichroic mirrors 33b and 33c, which is output from the illumination device 33.

The light flux 33d is mixed and converted to enlarged laser light 36 by a diffusion plate 35 to be incident on a polarized beam splitter 38 via a field lens 37. Then, the laser light 36 is reflected by a reflection surface 38a of the polarized beam splitter 38 to illuminate the one-side main surface 32 of the spatial light modulation element 31. After being subjected to modulation in the spatial light modulation element 31 according to the image signal, the laser beam 36 passes through the polarized beam splitter 38 again to be projected on a screen (not shown) by a projection lens 39.

Such a configuration allows the image display apparatus 30 capable of displaying a high-brightness and high-definition image to be implemented.

Here, the spatial light modulation element 31 may also be configured as a reflection-type liquid crystal display panel. The configuration allows the image display apparatus 30 having high light use efficiency and low power consumption to be implemented. Note that, even when the image display apparatus 30 is configured using DMD (a trademark of US Texas Instruments Inc.) or a transmission-type liquid crystal panel for the spatial light modulation element 31, an operation featuring high light use efficiency and low power consumption can be similarly implemented.

Figure 10A:
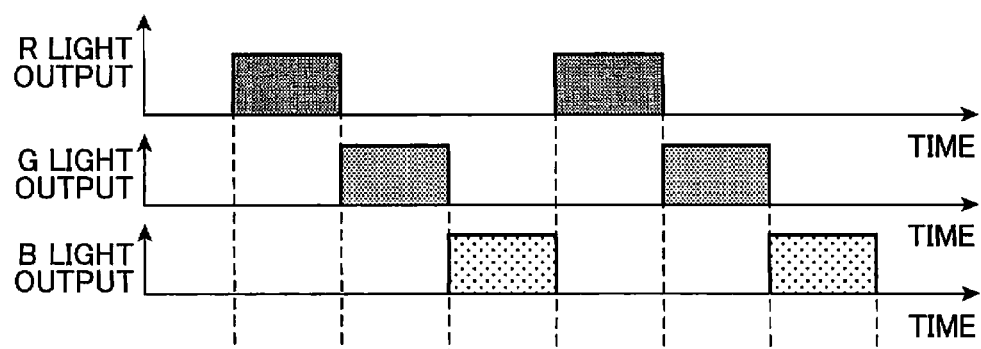
Figure 10B:
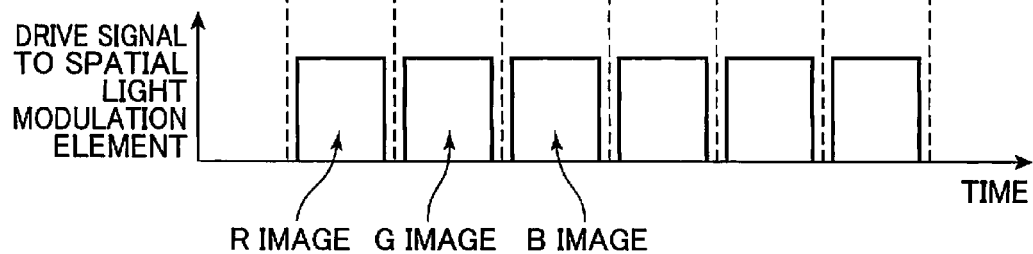

FIGS. 10A and 10B are views showing the timings of laser light and image drive signals when the image display apparatus 30 according to Embodiment 5 of the present invention is subjected to modulation according to the field sequential method, of which FIG. 10A is the view showing the timings of emission of the laser light and FIG. 10B is the view showing the timing of the drive signals for individual images in the spatial light modulation element 31.

As shown in FIGS. 10A and 10B, in accordance with typical modulation according to the field sequential method, by the control unit 40, the rising edges of the R light 34r, the G light 34g, and the B light 34b are driven in synchronization with the rising edges of the drive signal for an R image, a G image, and a B image in the spatial light modulation element 31. However, in such a case, if an optical output within one pulse varies, it may be difficult to precisely control the gradations of the color tones of the images.

Figure 11A:
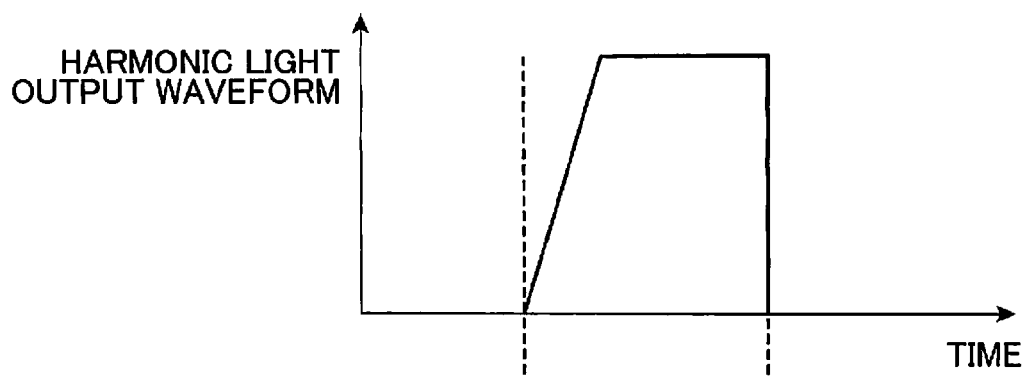
Figure 11B:
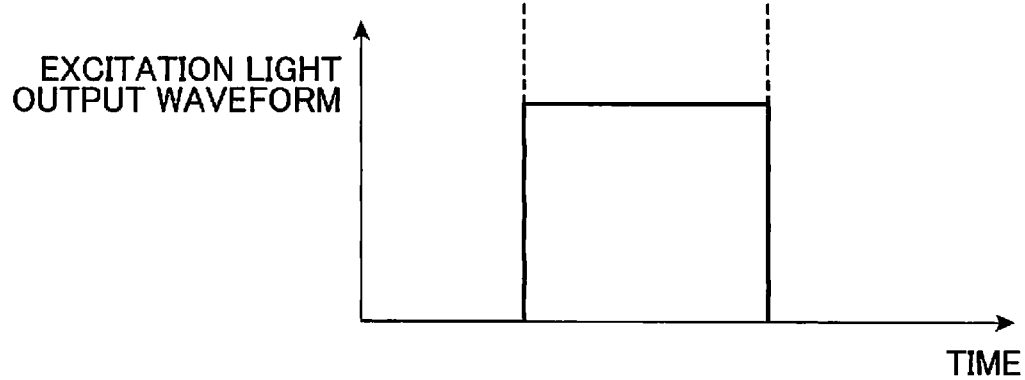
Figure 11C:
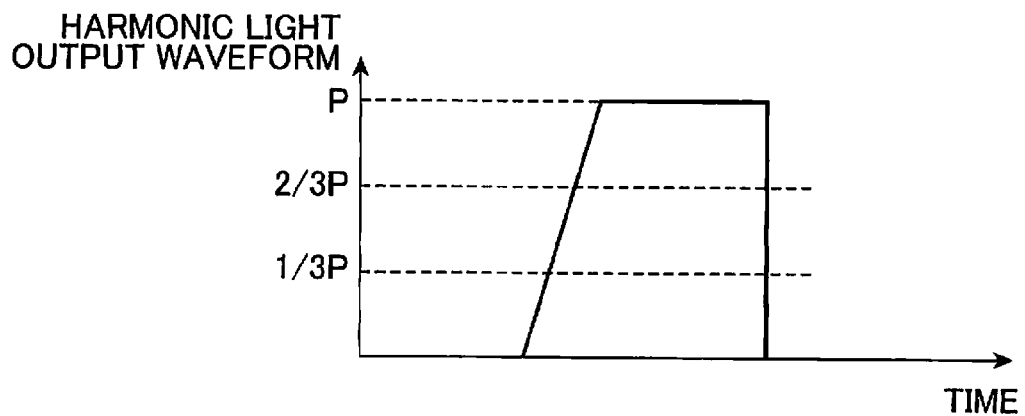

FIGS. 11A to 11C are views showing light output waveforms in the image display apparatus 30 according to Embodiment 5 of the present invention, of which FIG. 11A is a view showing a time waveform of a harmonic light output of the G light source 34G, FIG. 11B is a view showing a time waveform of an excitation light output for the harmonic light output shown in FIG. 11A, and FIG. 11C is a view showing an example in which the magnitude of the harmonic light output shown in FIG. 11A is equally divided.

As shown in FIG. 11B, even when the rising edge of the excitation light output is steep, it takes a time for the temperature of a laser medium, from which fundamental light is generated, to rise, for the thermal lens effect to occur, and for an output of the fundamental light to increase up to a predetermined magnitude. As a result, as shown in FIG. 11A, the rising edge of the output of the harmonic light may not be steep, but may tilt. Since it takes a little time for the G light 34g to rise, in such a case, the usual gradation control of color tones in an image display apparatus may be difficult.

This is because, as shown in FIG. 11C, even when the magnitude of the harmonic light output is equally divided, portions resulting from the division have different powers. That is, even if the maximum output P of the harmonic light is trisected into P/3 and 2P/3, the intensity of the harmonic light is not trisected. Therefore, even if the laser light 36 is simply modulated into ⅓ using the spatial light modulation element 31 in order to represent, e.g., a ⅓ gradation of the maximum gradation value, the ⅓ gradation is not achieved. As a result, to effect the gradation control of the color tones, it becomes necessary to sufficiently consider the slope of the output of the harmonic light at the time of the rising edge thereof.

Figure 12A:
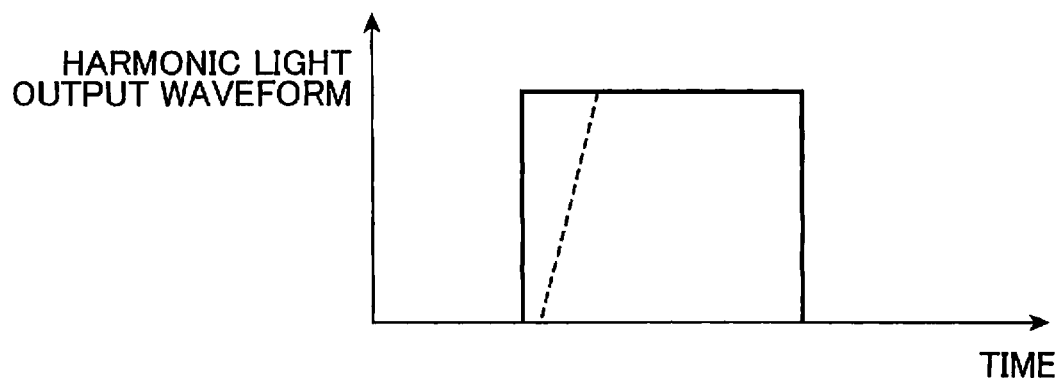
Figure 12B:
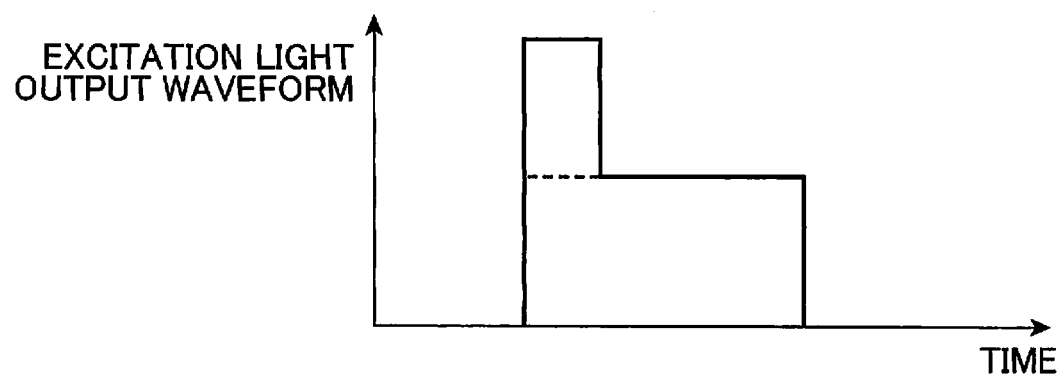

FIGS. 12A and 12B are views showing an excitation light output waveform and a harmonic light output waveform when the excitation laser light source is driven using a current waveform, shown in Embodiment 1 of the present invention, in which the signal intensity of the rising portion of the pulse modulation signal is higher than the average signal intensity thereof, of which FIG. 12A is a view showing the harmonic light output waveform and FIG. 12B is a view showing the excitation light output waveform.

As shown in FIG. 12B, when the excitation laser light source 11 is driven using the current waveform (i.e., a current waveform in which the average signal intensity I1 during the initial interval P1 is higher than the average signal intensity I2 during the remaining interval P2, as shown in FIG. 1B) in which the signal intensity of the rising portion of the pulse modulation signal is higher than the average signal intensity thereof, a temperature rise occurs in the laser medium 12 at an early stage and the thermal lens effect rapidly and remarkably appears. As a result, as shown in FIG. 12A, the output waveform of the harmonic light steeply rises. Note that, in FIGS. 12A and 12B, a drive method using a usual rectangular waveform and the rising edge of the harmonic light according thereto are shown by the broken lines for the sake of comparison.

As will be described below, the control unit 40 may also be configured to drive the drive signal to the spatial light modulation element 31 and the drive signal to the solid-state laser light source 34S in synchronization, to control the drive unit 15 to drive the excitation laser light source 11 of the solid-state laser light source 34S using the usual rectangular waveform, so that the rising edge of the excitation laser light source 11 of the solid-state laser light source 34S precedes the rising edge of the drive signal to the spatial light modulation element 31.

Figure 13A:
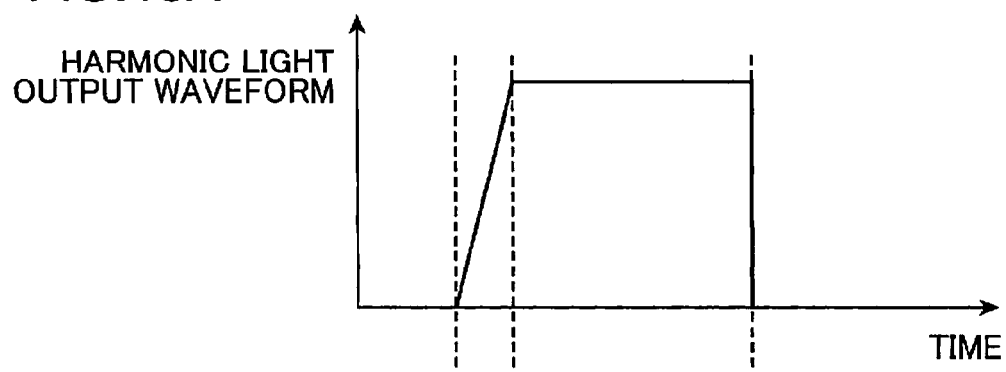
Figure 13B:
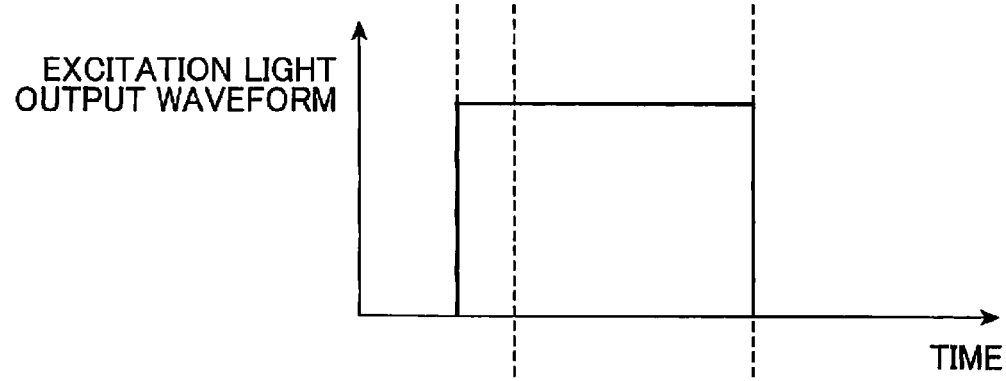
Figure 13C:
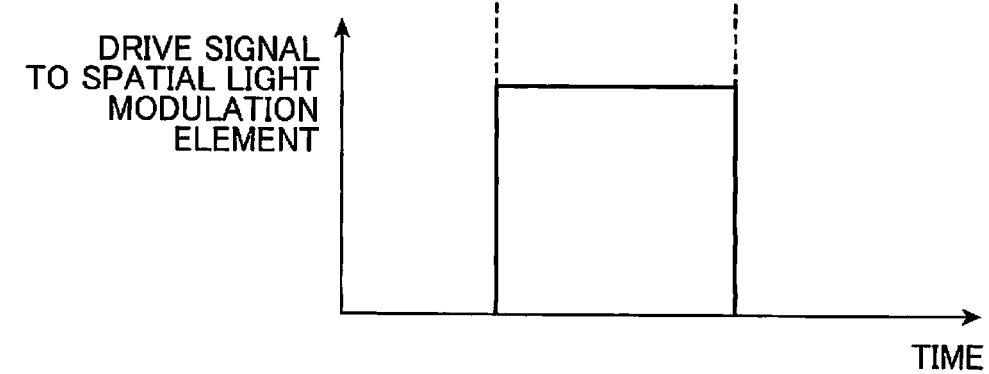

FIGS. 13A to 13C are views showing a temporal relationship between the drive signal and the harmonic light output of the spatial light modulation element 31 and the solid-state laser light source 34S, of which FIG. 13A is a view showing a time waveform of the harmonic light output, FIG. 13B is a view showing a time waveform of the excitation light output, and FIG. 13C is a view showing a time waveform of the drive signal to the spatial light modulation element 31.

As shown in FIGS. 13A to 13C, the cycle of the time waveform of the drive signal to the spatial light modulation element 31 is synchronized with that of the time waveform of the drive signal to the solid-state laser light source 34S, and the rising edge of the solid-state laser light source 34S precedes the rising edge of the drive signal to the spatial light modulation element 31. That is, the control unit 40 outputs a drive start control signal to the drive unit 15 of the solid-state laser light source 34S, and then outputs the drive signal to the spatial light modulation element 31. Accordingly, when the drive signal to the spatial light modulation element 31 rises, the thermal lens effect has sufficiently occurred in the laser medium 12 heated by the output of the excitation light 11a so that the harmonic light output has also risen. As a result, the solid-state laser light source 34S as the G light source 34G outputs the G light 34g, which is modulated in the spatial light modulation element 31 corresponding to the drive signal thereto so that gradation control becomes easy.

The configuration allows the image display apparatus 30 featuring a bright screen and excellent gradation control and capable of displaying a high-definition image to be implemented.

The control unit 40 may also be configured to drive the spatial light modulation element 31 at a frequency of not less than 180 Hz and not more than 1000 Hz. In general, flicker on the screen is no longer perceived by a human eye at a frequency of not less than 180 Hz, and color breaking no longer annoys the human eye at a frequency of not less than 360 Hz. Note that, in modulation at a frequency faster than 1000 Hz, signal processing becomes complicated, and such a fast modulation is unnecessary.

The configuration allows the high-definition image display apparatus 30 free from flicker on the screen and annoying color breaking to be implemented.

Embodiment 6

Figure 14A:
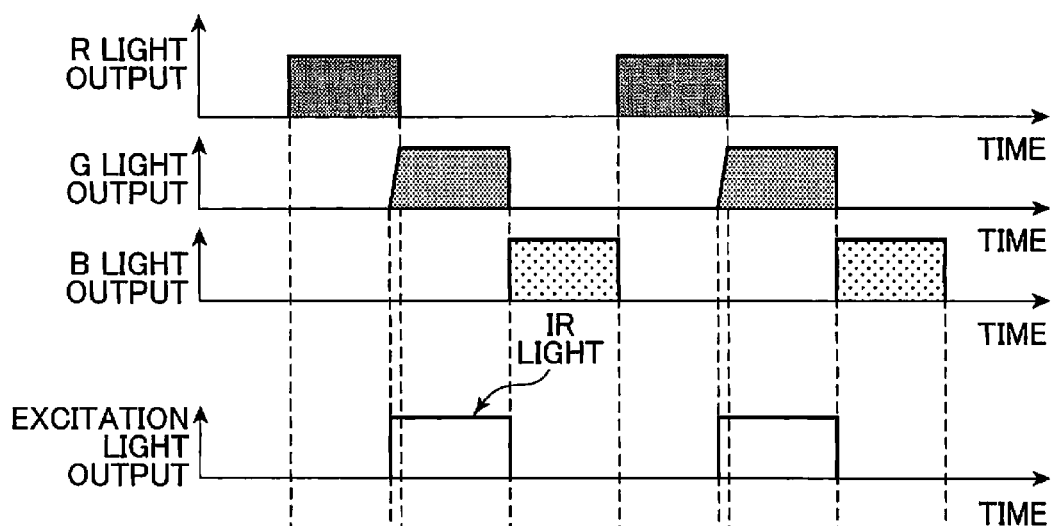
Figure 14B:
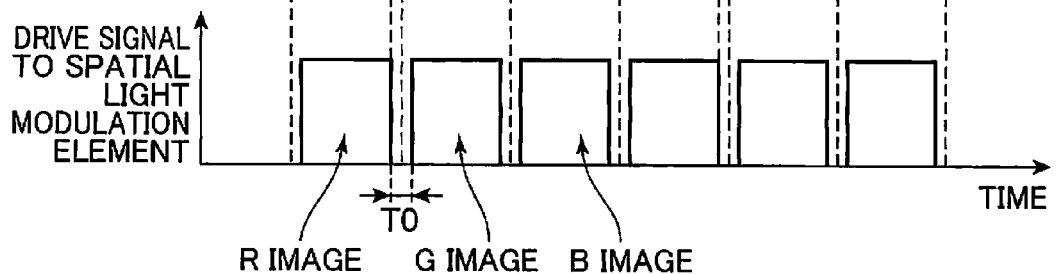
Figure 15:
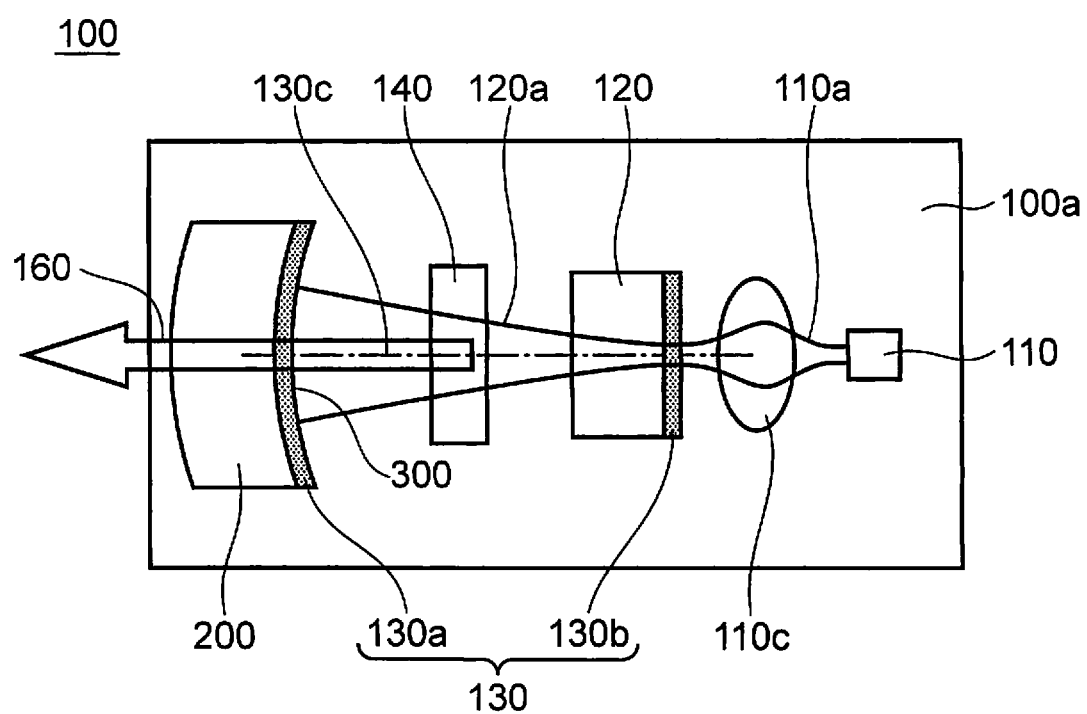
FIG. 15 is a plan view showing a schematic structure of a conventional wavelength conversion device.

FIGS. 14A and 14B are views showing the timings of laser light and image drive signals when the image display apparatus 30, according to Embodiment 6 of the present invention, is subjected to modulation in a field sequential method, of which FIG. 14A is a view showing the timings of emission of the laser light including excitation light and FIG. 14B is a view showing the timings of the drive signals for individual images in a spatial light modulation element. By causing the timing of the rising edge of an excitation light output to slightly precede the timing of the rising edge of the drive signal to the spatial light modulation element 31 and thereby causing the rise time of the light pulse of the optical output of the G light 34g to generally coincide with the rise time of the drive signal to the spatial light modulation element 31 in the field sequential method, gradation control is facilitated.

As shown in FIG. 14B, between the drive signals corresponding to the individual color images in the spatial light modulation element 31, a black period T0 during which the spatial light modulation element 31 is not driven is provided. Therefore, the control unit 40 outputs the drive start control signal to the drive unit 15 simultaneously with the falling edge of the drive signal corresponding to the R image in the spatial light modulation element 31. The control unit 40 allows the timing of the rising edge of the excitation light output to precede the timing of the rising edge of the drive signal corresponding to the G image in the spatial light modulation element 31 by the black period T0. As a result, it follows that, at the time of the rising edge of the drive signal corresponding to the G image in the spatial light modulation element 31, the optical output of the G light 34g has reached a sufficiently high level.

Note that, in FIGS. 14A and 14B, simultaneously with the falling edge of the drive signal corresponding to the R image in the spatial light modulation element 31, the excitation light output is caused to rise, but it is not limited thereto. The control unit 40 may also output a drive start control signal to the drive unit 15 earlier than the falling edge of the drive signal corresponding to the R image in the spatial light modulation element 31 by a predetermined time period. In this case also, since the output of the G light is small at the very beginning of driving, the R image is not adversely affected. The foregoing predetermined time period may be set appropriately to an upper-limit value within a range which does not adversely affect the R image. The control unit 40 allows the timing of the rising edge of the excitation light output to maximally precede the timing of the rising edge of the drive signal corresponding to the G image in the spatial light modulation element 31. As a result, at the time of the rising edge of the drive signal corresponding to the G image in the spatial light modulation element 31, it is possible to set the optical output of the G light 34g to a higher level.

In FIG. 14A, as the output waveform of the excitation light, the rectangular wave shape is used, but it is not limited thereto. As shown in, e.g., FIGS. 7B and 7D, as the output waveform of the excitation light, a waveform in which the intensity during the initial interval including the rising edge is higher than the intensity during the remaining interval may also be used. In this case, it is possible to more reliably steepen the rising edge of the optical output of the G light 34g.

Also, as shown in FIG. 9, the image display apparatus 30 may further include a light detector 39a that detects the laser light 36 at the outer end portion of the projection lens 39. And, the control unit 40 may also be configured to control the relationship between the timing of the rising edge of the drive signal to the spatial light modulation element 31 and the timing of the rising edge of the excitation laser light source 11 of the solid-state laser light source 34S such that the relationship temporally varies in accordance with the result of the detection by the light detector 39a.

The configuration allows the image display apparatus 30 featuring lower power consumption and easy gradation control to be implemented for the reason described below. A user of the image display apparatus 30 may vary the brightness of the image display apparatus 30 according to an environment in which the image display apparatus 30 is used. At a bright place, the brightness of the image display apparatus 30 may be increased to improve the visibility of an image while, on the other hand, at a dark place, the brightness of the image display apparatus 30 may be reduced to reduce power consumption. Recently, there is also a control technique called "scene control", which varies the output of the light source according to the brightness of the image displayed on the image display apparatus 30. By using the scene control, the power consumption of the light source can be reduced when the image is dark, and therefore the low-power-consumption image display apparatus 30 can be implemented.

In such cases, when the brightness of the image display apparatus 30 is reduced, the outputs of the R light source 34R, the G light source 34G, and the B light source 34B are reduced. At this time, since the output of the G light source 34G is reduced, the output of the excitation laser light source 11 of the solid-state laser light source 34S decreases. When the output of the excitation laser light source 11 decreases, the thermal lens effect of the laser medium 12 of the solid-state laser light source 34S decreases to delay the rising edge of the output of the harmonic light. The control unit 40 of the image display apparatus 30 determines whether or not the rising edge of the light output of a harmonic wave detected by the light detector 39a is delayed with respect to the rising edge of the drive signal to the spatial light modulation element 31. When determining that the rising edge of the light output of the harmonic wave is delayed, the control unit 40 controls the drive unit 15 to advance the time of the rising edge of the output of the excitation laser light source 11 by the time corresponding to the delay of the rising edge of the harmonic wave. By doing so, the rise time of the optical pulse of the optical output of the G light 34g generally coincides with the rise time of the drive signal to the spatial light modulation element 31 in the field sequential method, and therefore it is possible to implement the image display apparatus 30 featuring low power consumption and easy gradation control.

While the embodiments of the present invention have been described so far with examples, it is appreciated that various modifications can be made in the invention within the scope not departing from the gist of the present invention.

Note that the excitation laser light source 11 is not limited to the laser light source which emits light at a wavelength of 808 nm. The excitation laser light source 11 may also be a laser light source which emits light at a wavelength which allows the laser medium 12 and the additive contained in the laser medium 12 to absorb light with high efficiency.

Also, the excitation light source is not limited to the excitation laser light source 11 and may also be a light source which emits light at a wavelength which allows the laser medium 12 and the additive contained in the laser medium 12 to absorb light with high efficiency, such as a light emitting diode or a lamp.

Note that the additive of the laser medium 12 is not limited to Nd and may also be Yb, Pr, or the like.

Note that the wavelength of the light generated from the wavelength conversion element 14 is not limited to 532 nm, either. A desired wavelength may be obtained appropriately by optimizing the laser medium 12, the additive of the laser medium 12, and the wavelength conversion element 14.

As necessary, it may also be possible to provide, in a laser resonator, an element for selecting a wavelength, an element for selecting polarized light, and an element that generates a pulse.

Note that, in each of the specific embodiments described above, the invention having the following configuration is mainly included. That is, a wavelength conversion device according to an aspect of the present invention includes: an excitation light source that generates excitation light; a laser medium that generates fundamental light by means of the excitation light; two resonator mirrors that are disposed with the laser medium being interposed therebetween and resonate the fundamental light; a wavelength conversion element that is disposed between the two resonator mirrors and wavelength-converts the fundamental light to harmonic light; and a drive unit that generates a pulse modulation signal to pulse-drive the excitation light source, wherein the laser medium is formed of a material having a thermo-optical effect and a positive thermo-optical constant, the pulse modulation signal generated by the drive unit has an initial interval including a rising edge of a pulse and a remaining interval subsequent to the initial interval, and an average signal intensity during the initial interval is higher than an average signal intensity during the remaining interval.

According to the configuration, the excitation light source generates the excitation light. The laser medium generates the fundamental light by means of the excitation light. The two resonator mirrors are disposed with the laser medium being interposed therebetween and resonate the fundamental light. The wavelength conversion element is disposed between the two resonator mirrors and wavelength-converts the fundamental light to the harmonic light. The drive unit generates the pulse modulation signal to pulse-drive the excitation light source. The laser medium is formed of the material having the thermo-optical effect and the positive thermo-optical constant. The pulse modulation signal generated by the drive unit has the initial interval including the rising edge of the pulse and the remaining interval subsequent to the initial interval. The average signal intensity during the initial interval is higher than the average signal intensity during the remaining interval.

Therefore, the power of the excitation light incident on the laser medium during the initial interval of the pulse modulation signal is larger than the power of the excitation light during the remaining interval. Accordingly, an amount of heat generated in the laser medium during the initial interval of the pulse modulation signal is larger than an amount of heat generated therein during the remaining interval. Since the drive unit pulse-drives the excitation light source, the temperature of the laser medium is lowest immediately before the pulse modulation signal is input, and gradually rises to be constant when the pulse modulation signal is input. In the present configuration, the amount of heat generated in the laser medium during the initial interval of the pulse modulation signal is larger than the amount of heat generated therein during the remaining interval. Therefore, in the initial interval of the pulse modulation signal, it is possible to rapidly raise the temperature of the laser medium. Since the temperature of the laser medium can be rapidly raised, during the initial interval of the pulse modulation signal, the difference between the temperature of the laser medium in the vicinity of the optical axis of the fundamental light and the temperature thereof at a position apart from the optical axis in a direction perpendicular to the optical axis can be set larger than in the case where the average signal intensity during the initial interval of the pulse modulation signal is the same as the average signal intensity during the remaining interval thereof. Since the laser medium has the thermo-optical effect, when the temperature difference is produced in the direction perpendicular to the optical axis of the fundamental light, a refractivity difference is produced in the direction perpendicular to the optical axis of the fundamental light so that the laser medium has a thermal lens effect. In the present configuration, the laser medium is formed of the material having the positive thermo-optical constant so that, when a temperature distribution having a temperature difference in the direction perpendicular to the optical axis of the fundamental light is formed in the laser medium, the thermal lens effect of the laser medium has an effect provided by a convex lens. The present configuration allows the convex lens effect of the laser medium with respect to the fundamental light to be larger during the initial interval of the pulse modulation signal than when the average signal intensity during the initial interval of the pulse modulation signal is the same as the average signal intensity during the remaining interval thereof.

Therefore, from the time of the rising edge of the pulse modulation signal, the large convex lens effect can be obtained with respect to the fundamental light. As a result, from the time of the rising edge, the fundamental light is suitably converged in the laser medium, and therefore the two resonator mirrors can stably resonate the fundamental light from the time of the rising edge. This allows the wavelength conversion element to wavelength-convert the fundamental light to the harmonic light from the time of the rising edge of the pulse modulation signal. For the reason described above, the wavelength conversion device can solve the problem associated with a rise time during modulation, i.e., the problem that the rising edge of the harmonic light is not steep during pulse-driving and reduce a blank time at the rising edge during pulse-driving when used in an image display apparatus. Therefore, it is possible to implement a high-efficiency wavelength conversion device which allows a high-brightness and high-definition image to be displayed and is suitable for achieving a size reduction and a cost reduction.

The wavelength conversion device described above may also be configured such that, when a degree of parallelism between the two resonator mirrors is $\theta$ (arc-minute) and an energy of the pulse modulation signal during the initial interval is E (joule), the drive unit generates the pulse modulation signal which satisfies $3.33\theta+1<E<3.78\theta+3$.

In general, the intensity of the excitation light required at the time of the rising edge of the pulse modulation signal changes in accordance with the degree of parallelism between the two resonator mirrors. This is because, when the degree of parallelism between the two resonator mirrors is high, the fundamental light suitably resonates so that, even when the thermal lens effect resulting from the thermo-optical effect of the laser medium is small, the intensity of the harmonic light steeply rises but, when the degree of parallelism is low, the fundamental light does not suitably resonate so that the intensity of the harmonic light does not steeply rise. However, with the configuration, when the degree of parallelism between the two resonator mirror is $\theta$ (arc-minute) and the energy of the pulse modulation signal during the initial interval is E (joule), the drive unit generates the pulse modulation signal which satisfies $3.33\theta+1<E<3.78\theta+3$. As a result, in accordance with the degree of parallelism between the two resonator mirrors, the required intensity of the excitation light can be obtained and therefore the intensity of the harmonic light can be caused to steeply rise.

The wavelength conversion device described above may also be configured such that the laser medium is formed in a cylindrical shape having an axis parallel with a direction of incidence of the excitation light.

According to the configuration, the laser medium is formed in the cylindrical shape having the axis thereof parallel with the direction of incidence of the excitation light. This allows heat generated in the laser medium due to the incidence of the excitation light to be dissipated axially symmetrically to the optical axis of the excitation light. Therefore, it is possible to form a temperature distribution into an axially symmetrical configuration and provide an axially symmetrical distribution of refractivity variations caused by the thermo-optical effect. If the distribution of the refractivity variations is axially symmetrical, it is possible to more reliably prevent the thermal lens effect resulting from the thermo-optical effect from being distorted relative to the optical axis of the excitation light than in the case where the refractivity distribution is not axially symmetrical and more reliably prevent the beam shape of the fundamental light to be resonated by the two resonator mirrors from being distorted. By suppressing the distortion of the beam shape of the fundamental light, the harmonic light can be obtained with high efficiency.

The wavelength conversion device described above may also be configured to further include a holder that has a cylindrical hollow portion and holds the laser medium contained in the hollow portion.

Since the configuration includes the holder that has the cylindrical hollow portion and holds the laser medium contained in the hollow portion, it is possible to reliably dissipate the heat generated in the laser medium toward the holder axially symmetrically with respect to the optical axis of the excitation light.

The wavelength conversion device described above may also be configured such that a diameter of the laser medium is not less than double and not more than five times a diameter of the excitation light incident on the laser medium.

When the diameter of the laser medium is smaller than the diameter of the excitation light incident thereon, vignetting of the excitation light occurs at the surface of incidence of the laser medium to reduce efficiency. However, according to the configuration, the diameter of the laser medium is not less than double the diameter of the excitation light, and therefore the vignetting of the excitation light at the surface of incidence of the laser medium can be eliminated. Furthermore, since the diameter of the laser medium is not more than five times the diameter of the excitation light, the thermal resistance between the laser medium which generates heat through the absorption of the excitation light and the holder can be reduced. Therefore the temperature rise of the entire laser medium can be suppressed. As a result, it is possible to suppress a reduction in the efficiency of conversion from the excitation light to the fundamental light due to the temperature rise of the entire laser medium.

The wavelength conversion device described above may also be configured such that the drive unit generates a signal in which a direct-current signal having a signal intensity not exceeding a threshold at which the laser medium generates the fundamental light is superimposed on the pulse modulation signal.

According to the configuration, the drive unit generates the signal in which the direct-current signal having the signal intensity not exceeding the threshold at which the laser medium generates the fundamental light is superimposed on the pulse modulation signal. This allows the laser medium to steadily generate heat with the excitation light generated due to the superimposed direct-current signal. As a result, it is possible to steadily form a temperature distribution having a temperature difference in a plane perpendicular to the optical axis of the excitation light in the laser medium and further reduce the blank time to allow an earlier rising edge of the harmonic light. Therefore, it is possible to implement a high-efficiency wavelength conversion device which allows a high-brightness and high-definition image to be displayed and is suitable for achieving a size reduction and a cost reduction.

The wavelength conversion device described above may also be configured to further include a variable lens that is disposed between the excitation light source and the laser medium and has a variable curvature, wherein the drive unit drives the variable lens to set the curvature of the variable lens to a first curvature value during the initial interval of the pulse modulation signal and set the curvature of the variable lens to a second curvature value smaller than the first curvature value during the remaining interval of the pulse modulation signal.

According to the configuration, the drive unit drives the variable lens that is disposed between the excitation light source and the laser medium and has the variable curvature. The drive unit sets the curvature of the variable lens to the first curvature value during the initial interval of the pulse modulation signal and sets the curvature of the variable lens to the second curvature value smaller than the first curvature value during the remaining interval of the pulse modulation signal. Accordingly, the first curvature value is larger than the second curvature value so that the diameter of the excitation light incident on the laser medium is smaller during the initial interval of the pulse modulation signal than during the remaining interval thereof. As a result, the excitation light is more converged during the initial interval than during the remaining interval so that it is possible to promptly form a temperature distribution having a desired temperature difference in the laser medium in the initial interval of the pulse modulation signal to allow a further reduction in blank time and an earlier rising edge of the harmonic light. Therefore, it is possible to implement a high-efficiency wavelength conversion device which allows a high-brightness and high-definition image to be displayed and is suitable for achieving a size reduction and a cost reduction.

In the wavelength conversion device described above, of the two resonator mirrors, one resonator mirror may also be formed of an end surface of the laser medium and the other resonator mirror may also be formed of an end surface of the wavelength conversion element.

The configuration eliminates the need to newly dispose a resonator mirror, and therefore a compact wavelength conversion device can be implemented.

The wavelength conversion device described above may also be configured such that the laser medium and the wavelength conversion element are arranged adjacent to each other or are joined together, along an optical axis of the fundamental light.

The configuration allows a reduction in the length over which the laser medium and the wavelength conversion element are arranged in the direction along the optical axis of the fundamental light and allows a more compact wavelength conversion device to be implemented. Moreover, since there is no need to adjust the two resonator mirrors, a low-cost wavelength conversion device can be implemented.

The wavelength conversion device described above may also be configured to further include a wavelength selector outside or inside the excitation laser light source.

The configuration allows reductions in the wavelength variations of the excitation light resulting from variations of the temperature, and therefore a stable output of the harmonic light can be obtained. In addition, the blank time does not increase under the influence of temperature but is reduced and held, and therefore it is possible to implement a wavelength conversion device having a more stable output.

The wavelength conversion device described above may also be configured to further include a fundamental light detector that receives the fundamental light emitted from the wavelength conversion element, wherein the drive unit varies an intensity of modulation of the excitation light source in accordance with an output waveform of the fundamental light received by the fundamental light detector.

According to the configuration, the drive unit varies the intensity of modulation of the excitation light source in accordance with the output waveform of the fundamental light emitted from the wavelength conversion element. Therefore, by generating the pulse modulation signal so as to eliminate a characteristic difference resulting from the individual variability of the excitation light source, it is possible to stabilize the output of the harmonic light.

The wavelength conversion device described above may also be configured such that the pulse modulation signal generated by the drive unit has a maximum signal intensity at the time of a rising edge of the pulse modulation signal.

According to the configuration, the pulse modulation signal generated by the drive unit has the maximum signal intensity at the time of the rising edge of the pulse modulation signal, and therefore it is possible to more reliably allow an earlier rising edge of the harmonic light.

An image display apparatus according to another aspect of the present invention includes: a spatial light modulation element that spatially modulates incident light; and an illumination unit that includes a laser light source that emits light which illuminates the spatial light modulation element from one main surface side thereof, wherein the illumination unit includes a red laser light source that emits red laser light, a green laser light source that emits green laser light, and a blue laser light source that emits blue laser light, and the green laser light source is comprised of a solid-state laser light source that includes the wavelength conversion device described above.

The configuration uses the wavelength conversion device capable of reducing the blank time at the rising edge of the harmonic light during pulse-driving. Therefore, it is possible to implement an image display apparatus capable of displaying a high-brightness and high-definition image.

The image display apparatus described above may also be configured to further include a control unit that supplies a drive signal to the spatial light modulation element based on an image signal input thereto to drive the spatial light modulation element in accordance with a field sequential method, and causes the red, green, and blue laser light sources to successively emit light in synchronization with the drive signal supplied to the spatial light modulation element, wherein the control unit causes a rising edge of the pulse-drive of the excitation light source of the solid-state laser light source to precede a rising edge of the drive signal supplied to the spatial light modulation element.

According to the configuration, the rising edge of the pulse-drive of the excitation light source is caused to precede the rising edge of the drive signal supplied to the spatial light modulation element. This allows a further reduction in the blank time at the rising edge of the harmonic light during pulse-driving. Therefore, it is possible to implement an image display apparatus featuring a brighter screen and more excellent gradation control and capable of displaying a high-definition image.

An image display apparatus according to still another aspect of the present invention includes: a spatial light modulation element that spatially modulates incident light; an illumination unit that includes a red laser light source that emits red laser light, a green laser light source that emits green laser light and a blue laser light source that emits blue laser light, and illuminates the spatial light modulation element from one main surface side thereof; and a control unit that supplies a drive signal to the spatial light modulation element based on an image signal input thereto to drive the spatial light modulation element in accordance with a field sequential method, and causes the red, green, and blue laser light sources to successively emit light in synchronization with the drive signal supplied to the spatial light modulation element, wherein the green laser light source is comprised of a solid-state laser light source including a wavelength conversion device, wherein the wavelength conversion device includes: an excitation light source that generates excitation light; a laser medium that is formed of a material having a thermo-optical effect and a positive thermo-optical constant and generates fundamental light by means of the excitation light; two resonator mirrors that are disposed with the laser medium being interposed therebetween and resonate the fundamental light; a wavelength conversion element that is disposed between the two resonator mirrors and wavelength-converts the fundamental light to harmonic light; and a drive unit that pulse-drives the excitation light source, and wherein the control unit causes a rising edge of the pulse-drive of the excitation light source to precede a rising edge of the drive signal supplied to the spatial light modulation element.

According to the configuration, the rising edge of the pulse-drive of the excitation light source is caused to precede the rising edge of the drive signal supplied to the spatial light modulation element. This allows a reduction in the blank time at the rising edge of the harmonic light during pulse-driving. Therefore, it is possible to implement an image display apparatus featuring a bright screen and excellent gradation control and capable of displaying a high-definition image.

In the image display apparatus described above, the control unit may also be configured to cause the rising edge of the pulse-drive of the excitation light source to coincide in time with a falling edge of an immediately previous drive signal supplied to the spatial light modulation element that is driven in accordance with the field sequential method.

According to the configuration, the control unit causes the rising edge of the pulse-drive of the excitation light source to coincide in time with the falling edge of the immediately previous drive signal supplied to the spatial light modulation element that is driven in accordance with the field sequential method. Therefore, it is possible to allow an earlier rising edge of the harmonic light without adversely affecting the modulation of laser light in another color by the spatial light modulation element.

Alternatively, the control unit may also be configured to drive the spatial light modulation element with a frequency of not less than 180 Hz and not more than 1000 Hz.

The configuration allows a high-definition image display apparatus free from flicker on a screen and annoying color breaking to be implemented.

Alternatively, the image display apparatus may also be configured to further include a harmonic light detector that detects the harmonic light spatially modulated by the spatial light modulation element, wherein the control unit determines whether or not a rising edge of the harmonic light detected by the harmonic light detector is delayed from the rising edge of the drive signal to the spatial light modulation element, and advances, when determining that the rising edge of the harmonic light is delayed, the time of the rising edge of the pulse-drive of the excitation light source.

According to the configuration, when it is determined that the rising edge of the harmonic light detected by the harmonic light detector is delayed from the rising edge of the drive signal to the spatial light modulation element, the time of the rising edge of the pulse-drive of the excitation light source is advanced. Therefore, it is possible to reliably eliminate the blank time at the rising edge of the harmonic light during pulse-driving.

Alternatively, the spatial light modulation element may also be configured as a reflection-type liquid crystal display panel.

The configuration allows an image display apparatus having high light use efficiency and low power consumption to be implemented.

INDUSTRIAL APPLICABILITY

The wavelength conversion device of the present invention can solve a problem associated with a rise time during modulation, i.e., the problem that the rising edge of harmonic light during pulse-driving is not steep and reduce a blank time when used in an image display apparatus. Therefore, the wavelength conversion device can be implemented as a compact device which outputs stable harmonic light to provide usefulness. In addition, the use of the wavelength conversion device allows an image display apparatus capable of displaying a high-brightness and high-definition image to be implemented to provide usefulness.

The invention claimed is:

1. A wavelength conversion device, comprising:
an excitation light source that generates excitation light;
a laser medium that generates fundamental light by means of the excitation light;
two resonator mirrors that are disposed with the laser medium being interposed therebetween and resonate the fundamental light;
a wavelength conversion element that is disposed between the two resonator mirrors and wavelength-converts the fundamental light to harmonic light; and
a drive unit that generates a pulse modulation signal to pulse-drive the excitation light source, wherein
the laser medium is formed of a material having a thermo-optical effect and a positive thermo-optical constant,
the pulse modulation signal generated by the drive unit has an initial interval including a rising edge of a pulse and a remaining interval subsequent to the initial interval,
an average signal intensity during the initial interval is higher than an average signal intensity during the remaining interval, and
when a degree of parallelism between the two resonator mirrors is θ (arc-minute) and an energy of the pulse modulation signal during the initial interval is E (joule), the drive unit generates the pulse modulation signal which satisfies:

$$3.33\theta+1 < E < 3.78\theta+3.$$

2. The wavelength conversion device according to claim 1, further comprising a variable lens that is disposed between the excitation light source and the laser medium and has a variable curvature, wherein
the drive unit drives the variable lens to set the curvature of the variable lens to a first curvature value during the initial interval of the pulse modulation signal and set the curvature of the variable lens to a second curvature value smaller than the first curvature value during the remaining interval of the pulse modulation signal.

3. The wavelength conversion device according to claim 1, wherein, of the two resonator mirrors, one resonator mirror is formed of an end surface of the laser medium and the other resonator mirror is formed of an end surface of the wavelength conversion element.

4. The wavelength conversion device according to claim 3, wherein the laser medium and the wavelength conversion element are arranged adjacent to each other or are joined together, along an optical axis of the fundamental light.

5. The wavelength conversion device according to claim 1, further comprising a wavelength selector outside or inside the excitation laser light source.

6. The wavelength conversion device according to claim 1, further comprising a fundamental light detector that receives the fundamental light emitted from the wavelength conversion element, wherein
the drive unit varies an intensity of modulation of the excitation light source in accordance with an output waveform of the fundamental light received by the fundamental light detector.

7. The wavelength conversion device according to claim 1, wherein the pulse modulation signal generated by the drive unit has a maximum signal intensity at the time of a rising edge of the pulse modulation signal.

8. An image display apparatus comprising:
a spatial light modulation element that spatially modulates incident light;
an illumination unit that includes a red laser light source that emits red laser light, a green laser light source that emits green laser light, and a blue laser light source that emits blue laser light, and illuminates the spatial light modulation element from one main surface side thereof; and a control unit that supplies a drive signal to the spatial light modulation element based on an image signal input thereto to drive the spatial light modulation element in accordance with a field sequential method, and causes the red, green, and blue laser light sources to successively emit light in synchronization with the drive signal supplied to the spatial light modulation element, wherein the green laser light source is comprised of a solid-state laser light source that includes a wavelength conversion device, wherein the wavelength conversion device includes:
an excitation light source that generates excitation light;
a laser medium that generates fundamental light by means of the excitation light;
two resonator mirrors that are disposed with the laser medium being interposed therebetween and resonate the fundamental light;
a wavelength conversion element that is disposed between the two resonator mirrors and wavelength-converts the fundamental light to harmonic light; and
a drive unit that generates a pulse modulation signal to pulse-drive the excitation light source, wherein the laser medium is formed of a material having a thermo-optical effect and a positive thermo-optical constant, wherein the drive unit generates the pulse modulation signal having a pulse defined by an initial interval and a remaining interval subsequent to the initial interval, the initial interval including a rising edge of the pulse, wherein the drive unit gives the pulse a higher average signal intensity during the initial interval than the remaining interval, and wherein the control unit causes a rising edge of the pulse-drive of the excitation light source of the solid-state laser light source to precede a rising edge of the drive signal supplied to the spatial light modulation element.

9. The image display apparatus according to claim 8, wherein the control unit causes the rising edge of the pulse-drive of the excitation light source to coincide in time with a falling edge of an immediately previous drive signal supplied to the spatial light modulation element that is driven in accordance with the field sequential method.

10. The image display apparatus according to claim 8, wherein the control unit drives the spatial light modulation element with a frequency of not less than 180 Hz and not more than 1000 Hz.

11. The image display apparatus according to claim 8, further comprising a harmonic light detector that detects the harmonic light spatially modulated by the spatial light modulation element, wherein
the control unit determines whether or not a rising edge of the harmonic light detected by the harmonic light detector is delayed from the rising edge of the drive signal to the spatial light modulation element, and advances, when determining that the rising edge of the harmonic light is delayed, the time of the rising edge of the pulse-drive of the excitation light source.

12. The image display apparatus according to claim 8, wherein the spatial light modulation element is a reflection-type liquid crystal display panel.

13. A wavelength conversion device, comprising:
an excitation light source that generates excitation light;
a laser medium that generates fundamental light by means of the excitation light, the laser medium being formed in a cylindrical shape having an axis parallel with a direction of incidence of the excitation light;
two resonator mirrors that are disposed with the laser medium being interposed therebetween and resonate the fundamental light;
a wavelength conversion element that is disposed between the two resonator mirrors and wavelength-converts the fundamental light to harmonic light;
a drive unit that generates a pulse modulation signal to pulse-drive the excitation light source; and
a holder that has a cylindrical hollow portion and holds the laser medium contained in the hollow portion, wherein
the laser medium is formed of a material having a thermo-optical effect and a positive thermo-optical constant,
the pulse modulation signal generated by the drive unit has an initial interval including a rising edge of a pulse and a remaining interval subsequent to the initial interval,
an average signal intensity during the initial interval is higher than an average signal intensity during the remaining interval, and
a diameter of the laser medium is not less than double and not more than five times a diameter of the excitation light incident on the laser medium.

14. A wavelength conversion device, comprising:
an excitation light source that generates excitation light;
a laser medium that generates fundamental light by means of the excitation light;
two resonator mirrors that are disposed with the laser medium being interposed therebetween and resonate the fundamental light;
a wavelength conversion element that is disposed between the two resonator mirrors and wavelength-converts the fundamental light to harmonic light; and
a drive unit that generates a pulse modulation signal to pulse-drive the excitation light source, wherein
the laser medium is formed of a material having a thermo-optical effect and a positive thermo-optical constant,
the pulse modulation signal generated by the drive unit has an initial interval including a rising edge of a pulse and a remaining interval subsequent to the initial interval,
an average signal intensity during the initial interval is higher than an average signal intensity during the remaining interval, and
the drive unit generates a signal in which a direct-current signal having a signal intensity not exceeding a threshold at which the laser medium generates the fundamental light is superimposed on the pulse modulation signal.

15. An image display apparatus, comprising:
a spatial light modulation element that spatially modulates incident light;
an illumination unit that includes a red laser light source that emits red laser light, a green laser light source that emits green laser light and a blue laser light source that emits blue laser light, and illuminates the spatial light modulation element from one main surface side thereof; and
a control unit that supplies a drive signal to the spatial light modulation element based on an image signal input thereto to drive the spatial light modulation element in accordance with a field sequential method, and causes the red, green, and blue laser light sources to successively emit light in synchronization with the drive signal supplied to the spatial light modulation element, wherein the green laser light source is comprised of a solid-state laser light source including a wavelength conversion device, wherein the wavelength conversion device includes:

an excitation light source that generates excitation light;

a laser medium that is formed of a material having a thermo-optical effect and a positive thermo-optical constant and generates fundamental light by means of the excitation light;

two resonator mirrors that are disposed with the laser medium being interposed therebetween and resonate the fundamental light;

a wavelength conversion element that is disposed between the two resonator mirrors and wavelength-converts the fundamental light to harmonic light; and a drive unit that pulse-drives the excitation light source, and wherein the control unit causes a rising edge of the pulse-drive of the excitation light source to precede a rising edge of the drive signal supplied to the spatial light modulation element.

* * * * *